(12) United States Patent
Yang et al.

(10) Patent No.: US 11,979,242 B2
(45) Date of Patent: May 7, 2024

(54) TRANSMISSION METHOD, APPARATUS, AND COMPUTER-READABLE STORAGE MEDIUM

(71) Applicant: ZTE CORPORATION, Shenzhen (CN)

(72) Inventors: Dan Yang, Shenzhen (CN); Ning Wei, Shenzhen (CN); Bo Sun, Shenzhen (CN); Nan Li, Shenzhen (CN); Zhiqiang Han, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/306,563

(22) Filed: Apr. 25, 2023

(65) Prior Publication Data

US 2023/0261806 A1 Aug. 17, 2023

Related U.S. Application Data

(63) Continuation of application No. 17/286,394, filed as application No. PCT/CN2019/110574 on Oct. 11, 2019, now Pat. No. 11,671,211.

(30) Foreign Application Priority Data

Oct. 19, 2018 (CN) .................. 201811221633.X

(51) Int. Cl.
*H04L 1/1867* (2023.01)
*H04L 1/1812* (2023.01)
*H04L 5/00* (2006.01)

(52) U.S. Cl.
CPC ............ *H04L 1/188* (2013.01); *H04L 1/1816* (2013.01); *H04L 1/1896* (2013.01); *H04L 5/0055* (2013.01); *H04L 1/1874* (2013.01)

(58) Field of Classification Search
CPC ... H04L 1/1816; H04L 1/1896; H04L 5/0078; H04L 5/0055; H04L 1/1874; H04L 1/188; H04L 1/1806; H04L 1/1829; H04L 1/1835
See application file for complete search history.

(56) References Cited

U.S. PATENT DOCUMENTS

| | | | |
|---|---|---|---|
| 6,522,650 B1 | 2/2003 | Yonge, III et al. | |
| 9,037,936 B2 * | 5/2015 | Chang ................... | H04L 1/1893 714/749 |

(Continued)

FOREIGN PATENT DOCUMENTS

| | | |
|---|---|---|
| CN | 101060386 A | 10/2007 |
| CN | 101162978 A | 4/2008 |

(Continued)

OTHER PUBLICATIONS

Singh, J., Pesch, D. Smart error-control strategy for low-power communication in wireless networked control system. Telecommun Syst 55, 253-269 (2014). (Year: 2014).*

(Continued)

*Primary Examiner* — Cynthia Britt
(74) *Attorney, Agent, or Firm* — Morgan, Lewis & Bockius LLP

(57) ABSTRACT

A transmission method includes creating an automatic repeat request process for a first packet; setting a lifetime for the automatic repeat request process; and sending the first packet; and when a preset retransmission condition in the lifetime of the automatic repeat request process is satisfied, retransmitting a second packet; where the preset retransmission condition includes that at least part of the time instants within the first predetermined time interval after an incorrect-reception acknowledgement frame returned by the receiver is received is beyond the lifetime of the automatic repeat request; where retransmitting the second packet (Continued)

includes: extending the lifetime of the automatic repeat request process to a third predetermined time interval following the first predetermined time interval, where the third predetermined time interval is at least a time period required for retransmitting the second packet; and retransmitting the second packet after the first predetermined time interval.

20 Claims, 5 Drawing Sheets

(56) References Cited

U.S. PATENT DOCUMENTS

| | | | | |
|---|---|---|---|---|
| 10,903,940 | B2* | 1/2021 | Sagfors | H04L 1/1887 |
| 11,190,626 | B2 | 11/2021 | Liu et al. | |
| 2003/0103459 | A1* | 6/2003 | Connors | H04L 1/1877 370/235 |
| 2003/0103521 | A1 | 6/2003 | Raphaeli et al. | |
| 2005/0094667 | A1* | 5/2005 | Dahlman | H04L 1/1819 370/473 |
| 2007/0214399 | A1 | 9/2007 | Lim et al. | |
| 2016/0157230 | A1 | 6/2016 | Nord et al. | |
| 2017/0141880 | A1 | 5/2017 | So et al. | |
| 2021/0136729 | A1 | 5/2021 | Yasukawa et al. | |
| 2021/0359794 | A1* | 11/2021 | Yang | H04L 1/188 |

FOREIGN PATENT DOCUMENTS

| | | |
|---|---|---|
| CN | 103078721 A | 5/2013 |
| CN | 104836648 A | 8/2015 |
| CN | 107257270 A | 10/2017 |
| EP | 1583270 A1 | 10/2005 |
| EP | 1821446 A2 | 8/2007 |
| WO | WO-2007131880 A1 | 11/2007 |
| WO | WO-2017091968 A1 | 6/2017 |
| WO | WO-2018123950 A1 | 7/2018 |

OTHER PUBLICATIONS

Chinese Office Action for Application No. 201811221633.X, dated Jul. 1, 2022, 10 pages including translation.
Extended European Search Report for Application No. 19873171.3, dated Jun. 24, 2022, 9 pages.
Chinese Office Action for Application No. 201811221633.X, dated Nov. 22, 2021, 20 pages including translation.
International Search Report for Application No. PCT/CN2019/110574, dated Jan. 2, 2020, 4 pages including translation.
Li-Chun Wang and Chih-Wen Chang, "Gap Processing Time Analysis of Stall Avoidance Schemes for High-Speed Downlink Packet Access with Parallel HARQ Mechanisms," in IEEE Transactions on Mobile Computing, vol. 5, No. 11, pp. 1591-1605, Nov. 2006, (Year: 2006).

* cited by examiner

TRANSMISSION METHOD, APPARATUS, AND COMPUTER-READABLE STORAGE MEDIUM

CROSS-REFERENCE TO RELATED APPLICATIONS

This application is a continuation of U.S. application Ser. No. 17/286,394 filed on Apr. 16, 2021, now U.S. Pat. No. 11,671,211, which is the U.S. National Phase Application under 35 U.S.C. § 371 of International Application No. PCT/CN2019/110574 filed Oct. 11, 2019, which claims priority to Chinese patent application No. 201811221633.X filed on Oct. 19, 2018, the disclosures of which are incorporated herein by reference in their entireties.

TECHNICAL FIELD

Embodiments of the present disclosure relate to a transmission method, apparatus, and a computer-readable storage medium.

BACKGROUND

With the development of wireless network technology, network performance is constantly improved. Meanwhile, the requirements for transmission reliability are increasingly high, and edge users are supported.

In a wireless network operating in an unlicensed frequency band, the principle of Listen Before Talk (LBT) needs to be followed. That is, a device needs to listen to a channel before access and needs to delay access to a propagation medium if the device detects that another device is performing transmission.

In a wireless local area network, for example, a wireless local area network operating in an unlicensed frequency band, common devices are stations (STAs) including access points (APs) and non-access points (non-APs). Multiple APs form one basic service set (BSS). A non-AP associates with an AP through a scanning, authentication and association process. The non-AP communicates with the AP or communicates with other STAs through the AP. In another type of wireless local area network, for example, an independent BSS (IBSS), there is no AP-like access point, and all stations can communicate with each other directly. Regardless of the type of a wireless local area network, a station needs to access a propagation medium by contending for a channel. Moreover, the packet acknowledgment mechanism currently used in a wireless local area network is as follows: A sender sends a packet. The packet carries a response policy. The response policy is used for indicating whether a receiver needs to return a correctness acknowledgment frame. In the case where it is indicated that the receiver needs to return a correctness acknowledgment frame, the receiver receives the packet, and when determining that the reception is incorrect, the receiver does not make any response and discards the packet. The discarded packet still contains valid information. In order for the valid information to be used, an automatic repeat request mechanism is introduced to the wireless local area network. That is, when it is determined that the received packet is incorrect, the receiver buffers the packet and uses the packet for combination processing, and the sender retransmits the packet or a different redundancy version of the packet.

In a wireless network operating in an unlicensed frequency band, in the process of executing an automatic repeat request mechanism, a sender needs to listen to a channel first each time a packet is retransmitted or a different redundancy version of the packet is retransmitted. Due to factors such as uncertainty of an access time, an automatic repeat request process corresponding to the packet occupies corresponding management and storage resources too long a time. Moreover, the maximum number of automatic repeat request processes concurrently supported by a device is limited by the capability of the device. As a result, if resources are not released in time, a new automatic repeat request process cannot be created. Thus, the transmission efficiency is reduced.

SUMMARY

Embodiments of the present disclosure provide a transmission method, apparatus, and a computer-readable storage medium.

In a first aspect, an embodiment of the present disclosure provides a transmission method which includes the processes below.

An automatic repeat request process is created for a first packet; a lifetime for the automatic repeat request process is set; and the first packet is sent.

In response to determining that a preset retransmission condition in the lifetime of the automatic repeat request process is satisfied, a second packet is retransmitted, wherein the first packet and the second packet carry a same first predetermined number.

The preset retransmission condition comprises that at least part of the time instants within the first predetermined time interval after an incorrect-reception acknowledgement frame returned by the receiver is received is beyond the lifetime of the automatic repeat request;

The second packet is retransmitted by extending the lifetime of the automatic repeat request process to a third predetermined time interval following the first predetermined time interval after the incorrect-reception acknowledgement frame returned by the receiver is received, wherein the third predetermined time interval is at least a time period required for retransmitting the second packet; and retransmitting the second packet after the first predetermined time interval after the incorrect-reception acknowledgement frame returned by the receiver is received.

In a second aspect, an embodiment of the present disclosure provides a transmission method which includes the processes below.

A first packet is received from a sender.

In response to determining that reception of the first packet is incorrect and obtaining a first predetermined number carried in the first packet, an incorrect-reception acknowledgement frame is sent to the sender, and a lifetime of an automatic repeat request process corresponding to the first predetermined number is kept until the lifetime of the automatic repeat request process expires, where the first predetermined number comprises at least one of: a process number or a packet number.

A second packet retransmitted by the sender is received after a first predetermined time interval in a case where the sender determines that the lifetime of the automatic repeat request process satisfies a preset retransmission condition and extends the lifetime of the automatic repeat request process to a third predetermined time interval following the first predetermined time interval after the sender receives the incorrect-reception acknowledgement frame.

The preset retransmission condition comprises that at least part of the time instants within the first predetermined time interval after the sender receives an incorrect-reception acknowledgement frame returned by the receiver is beyond the lifetime of the automatic repeat request; and the first packet and the second packet carry a same first predetermined number.

In a third aspect, an embodiment of the present disclosure provides a transmission method which includes the processes below.

A first packet is received from a sender.

In response to determining that reception of the first packet is incorrect, an incorrect-reception acknowledgement frame is sent to the sender, and a lifetime of a first automatic retransmission buffer block corresponding to the first packet is kept until the lifetime of the automatic repeat request process expires.

A second packet retransmitted by the sender is received after a first predetermined time interval in a case where the sender determines that the lifetime of the automatic repeat request process satisfies a preset retransmission condition and extends the lifetime of the automatic repeat request process to a third predetermined time interval following the first predetermined time interval after the sender receives the incorrect-reception acknowledgement frame.

The preset retransmission condition comprises that at least part of the time instants within the first predetermined time interval after the sender receives an incorrect-reception acknowledgement frame returned by the receiver is beyond the lifetime of the automatic repeat request; and the first packet and the second packet carry a same first predetermined number which comprises at least one of: a process number or a packet number.

In a fourth aspect, an embodiment of the present disclosure provides a transmission apparatus. The transmission apparatus includes a processor and a computer-readable storage medium storing instructions. The processor executes the instructions to perform any preceding transmission method.

In a fifth aspect, an embodiment of the present disclosure provides a non-computer computer-readable storage medium storing a computer program. A processor executes the computer program to perform any preceding transmission method is performed.

BRIEF DESCRIPTION OF DRAWINGS

The drawings are intended to provide a further understanding of solutions of embodiments of the present disclosure, constitute a part of the description, illustrate solutions of embodiments of the present disclosure in conjunction with embodiments of the present application, and do not limit solutions of embodiments of the present disclosure.

DETAILED DESCRIPTION

Embodiments of the present disclosure are described in detail hereinafter in conjunction with the drawings. It is to be noted that if not in collision, the embodiments and features therein in the present disclosure may be combined with each other.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

Figure 1:
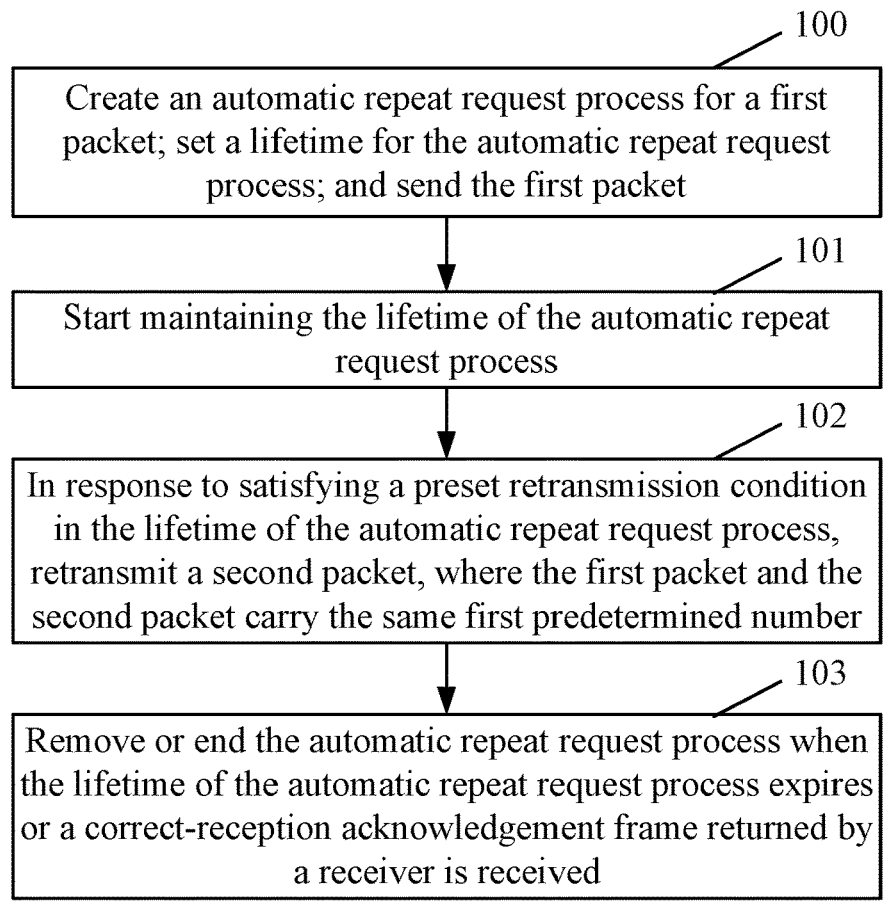
FIG. 1 is a flowchart of a transmission method according to an embodiment of the present disclosure.

Referring to FIG. 1, an embodiment of the present disclosure provides a transmission method. The transmission method includes step 100.

In step 100, an automatic repeat request process is created for a first packet; a lifetime is set for the automatic repeat request process; and the first packet is sent.

In this embodiment of the present disclosure, the automatic repeat request process may be created for the first packet before, when or after the first packet is sent. That is, the time when the automatic repeat request process of the first packet is created is acceptable as long as the absolute value of the difference between the time when the first packet is sent and the time when the automatic repeat request process of the first packet is created is within a predetermined time threshold.

In this embodiment of the present disclosure, the first packet may be a newly transmitted packet or a retransmitted packet, which is not limited in this embodiment of the present disclosure.

In another embodiment of the present disclosure, the method further includes step 101.

In step 101, the lifetime of the automatic repeat request process starts to be maintained.

In this embodiment of the present disclosure, the lifetime of the automatic repeat request process may be maintained through a timer or a counter.

In some embodiments of the present disclosure, the lifetime includes at least one of: a time length, an end time instant of the lifetime, or a number of times.

In some embodiments of the present disclosure, the time length includes one of: an effective-time length or a remaining-time length.

In some embodiments of the present disclosure, the number of times includes one of: a total number of times of a newly transmitted packet and a retransmitted packet carrying the same first predetermined number as the newly transmitted packet, a total number of remaining times of the newly transmitted packet and the retransmitted packet carrying the same first predetermined number as the newly transmitted packet, a total number of times of the retransmitted packet, or a total number of remaining times of the retransmitted packet.

The effective-time length refers to a time interval from the time when the automatic repeat request process is created or configured to the time when the automatic repeat request process is removed.

The remaining-time length refers to a time interval from the current time to the time when the automatic repeat request process is removed.

The end time instant of the lifetime refers to a time instant when the automatic repeat request process is removed.

In some embodiments of the present disclosure, when the lifetime is the effective-time length or the remaining-time length, the lifetime of automatic repeat request process can be maintained through a timer, specifically through a timing manner or a countdown timing manner.

When the lifetime is the total number of times of the newly transmitted packet and the retransmitted packet, the total number of remaining times of the newly transmitted packet and the retransmitted packet, the total number of times of the retransmitted packet, or the number of remaining times of the retransmitted packet, the lifetime of automatic repeat request process can be maintained through a counter, specifically through a counting manner or a backward counting manner.

In this embodiment of the present disclosure, the time instant when the lifetime of the automatic repeat request process starts to be maintained is not limited. For example, the lifetime of the automatic repeat request process may start to be maintained when the lifetime of the automatic repeat request process is set.

In some embodiments of the present disclosure, the lifetime is obtained in one of the manners below.

In a first manner, the lifetime is obtained according to a second predetermined number of the packet and a mapping relationship between the lifetime and the second predetermined number of the packet.

In a second manner, the lifetime is obtained according to the second predetermined number of the packet and a mapping between the second predetermined number of the packet and one of the end time of the lifetime, a remaining-time length, or the number of remaining times.

In a third manner, the lifetime is obtained according to a notified lifetime.

In a fourth manner, the lifetime is obtained according to a negotiated lifetime.

In a fifth manner, the lifetime is obtained according to a preset lifetime.

In some embodiments of the present disclosure, the second predetermined number may be a redundancy version number.

In another embodiment of the present disclosure, the method further includes step 102.

In step 102, in response to satisfying a preset retransmission condition in the lifetime of the automatic repeat request process, a second packet is retransmitted, where the first packet and the second packet carry a same first predetermined number.

In some embodiments of the present disclosure, in the process of determining whether the preset retransmission condition is satisfied in the lifetime of the automatic repeat request process and the process of retransmitting the second packet, the lifetime of the automatic repeat request process continues being maintained.

In some embodiments of the present disclosure, the first predetermined number includes at least one of a process number or a packet number.

In this embodiment of the present disclosure, the preset retransmission condition includes at least one of the conditions below.

1. An incorrect-reception acknowledgement frame returned by a receiver is received.

2. The time instant when a channel is obtained through a contention access mechanism is within the lifetime of the automatic repeat request process.

3. All time instants in a first predetermined time interval after the incorrect-reception acknowledgement frame returned by the receiver is received are in the lifetime of the automatic repeat request process.

4. An acknowledgement frame returned by the receiver is not received in a second predetermined time interval. The acknowledgement frame includes a correct-reception acknowledgement frame or an incorrect-reception acknowledgement frame.

When the incorrect-reception acknowledgement frame returned by the receiver is received, the second packet may be retransmitted using one of the methods below.

In a first method, the second packet is retransmitted following the first predetermined time interval (for example, Short Interframe Space (SIFS)) after the incorrect-reception acknowledgement frame returned by the receiver is received.

In this method, all time instants in a first predetermined time interval after the incorrect-reception acknowledgement frame returned by the receiver is received are within the lifetime of the automatic repeat request process by default. Therefore, it is considered that the lifetime does not expire after the first predetermined time interval, and the second packet can be retransmitted after the first predetermined time interval.

In a second method, the second packet is retransmitted after the incorrect-reception acknowledgement frame returned by the receiver is received, within the lifetime, and when the channel is obtained through the contention access mechanism.

In a third method, when all time instants within the first predetermined time interval after the incorrect-reception acknowledgement frame returned by the receiver is received are in the lifetime of the automatic repeat request process, the second packet is retransmitted after the first predetermined time interval after the incorrect-reception acknowledgement frame returned by the receiver is received; when some or all of the time instant within the first predetermined time interval after the incorrect-reception acknowledgement frame returned by the receiver is received are beyond the lifetime of the automatic repeat request process, the lifetime of the automatic repeat request process is extended to a third predetermined time interval that is after the first predetermined time interval after the incorrect-reception acknowledgement frame returned by the receiver is received. The third predetermined time interval is at least a time required period for retransmitting the second packet. The second packet is retransmitted after the first predetermined time interval after the incorrect-reception acknowledgement frame returned by the receiver is received.

In a fourth method, when all time instants within the first predetermined time interval after the incorrect-reception acknowledgement frame returned by the receiver is received are within the lifetime of the automatic repeat request process, the second packet is retransmitted after the first predetermined time interval after the incorrect-reception acknowledgement frame returned by the receiver is received; when some or all of the time instants within the first predetermined time interval after the incorrect-reception acknowledgement frame returned by the receiver is received are beyond the lifetime of the automatic repeat request process, the automatic repeat request process is removed when the lifetime of the automatic repeat request process expires, that is, the second packet is no longer retransmitted after the first predetermined time interval after the incorrect-reception acknowledgement frame returned by the receiver is received.

In some embodiments of the present disclosure, the first packet or the second packet further carries at least one of: a lifetime, an end time instant of the lifetime, a remaining-time length, or a number of remaining times.

In some embodiments of the present disclosure, the second packet is the same as the first packet, or the redundancy version of the second packet is different from the redundancy version of the first packet.

In another embodiment of the present disclosure, the method further includes step 103.

In step 103, the automatic repeat request process is removed or ended when the lifetime of the automatic repeat request process expires or a correct-reception acknowledgement frame returned by a receiver is received.

In another embodiment of the present disclosure, when the lifetime is a time length and the lifetime is maintained by timing, expiration of the lifetime means that the timer reaches the time length indicted by the lifetime.

When the lifetime is the end time instant and the lifetime is maintained by a timing manner, expiration of the lifetime means that the timer reaches the end time instant.

When the lifetime is the number of times and the lifetime is maintained by a counting manner, expiration of the lifetime means that the counter reaches the number of times indicted by the lifetime.

When the lifetime is the time length and the number of times and the lifetime is maintained by a timing and counting manner, expiration of the lifetime means that one of the following conditions is satisfied: The timer reaches the time length indicted by the lifetime, or the counter reaches the number of times indicted by the lifetime.

When the lifetime is the end time and the number of times and the lifetime is maintained by timing and counting, expiration of the lifetime means that one of the following conditions is satisfied: the timer reaches the end time of the lifetime, or the counter reaches the number of times indicted by the lifetime.

When the lifetime is maintained by a countdown timing manner, expiration of the lifetime means that the timer reaches 0.

When the lifetime is maintained by a backward counting manner, expiration of the lifetime means that the counter reaches 0.

When the lifetime is maintained by a countdown timing and backward counting manner, expiration of the lifetime means that one of the following conditions is satisfied: the timer reaches 0, or the counter reaches 0.

In some embodiments of the present disclosure, the automatic repeat request process is removed or ended in at least one of the states below.

A first state is stopping sending the first packet or stopping retransmitting the second packet.

A second state is stopping sending a packet carrying the first predetermined number.

A third state is stopping sending the first packet or stopping retransmitting the second packet through an automatic repeat request mechanism.

In this embodiment of the present disclosure, the automatic repeat request process corresponding to the first packet or the second packet is removed or ended when the lifetime of the automatic repeat request process expires or the correct-reception acknowledgement frame returned by the receiver is received, so that the automatic repeat request process can be removed in time. In this manner, in the case where a limited number of automatic repeat request processes are simultaneously supported, a new automatic repeat request process can be created for a newly transmitted packet in time, and thus the transmission efficiency is improved.

Figure 2:
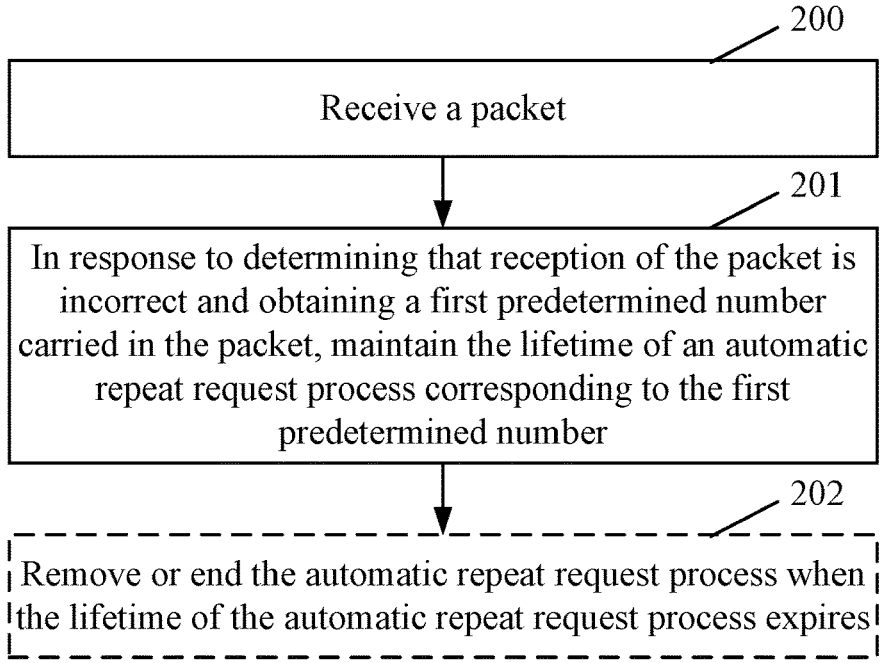
FIG. 2 is a flowchart of a transmission method according to another embodiment of the present disclosure.

Referring to FIG. 2, another embodiment of the present disclosure provides a transmission method. The transmission method includes steps 200 and 201.

In step 200, a packet is received.

In step 201, in response to determining that reception of the packet is incorrect and obtaining a first predetermined number carried in the packet, the lifetime of an automatic repeat request process corresponding to the first predetermined number is maintained.

In some embodiments of the present disclosure, the first predetermined number includes at least one of: a process number or a packet number.

In some embodiments of the present disclosure, when it is determined that reception of the packet is incorrect, an incorrect-reception acknowledgement frame may be returned or no information is returned; when it is determined that reception of the packet is correct, a correct-reception acknowledgement frame is returned.

In some embodiments of the present disclosure, the lifetime of the automatic repeat request process corresponding to the first predetermined number is maintained in at least one of the manners below.

In a first manner, in response to the received packet satisfying a first predetermined condition, the lifetime of the automatic repeat request process corresponding to the first predetermined number starts to be maintained. When the lifetime of the automatic repeat request process is maintained through a timer, the timer may be caused to start timing or countdown timing. When the lifetime of the automatic repeat request process is maintained through a counter, the counter may be caused to start counting or backward counting.

In a second manner, in response to the received packet satisfying a second predetermined condition, the lifetime of the automatic repeat request process that is the same as the first predetermined number of the packet continues being maintained. When the lifetime of the automatic repeat request process is maintained through a timer, the timer may be caused to continue timing or countdown timing or may be caused to perform timing or countdown timing according to a regained lifetime. When the lifetime of the automatic repeat request process is maintained through a counter, the counter may be caused to start counting or backward counting or may be caused to perform counting or backward counting according to a regained lifetime.

In some embodiments of the present disclosure, the first predetermined condition includes one of the following: the received packet is a newly transmitted packet; or the first predetermined number of the received packet is different from first predetermined numbers corresponding to all currently maintained automatic repeat request processes.

In some embodiments of the present disclosure, the second predetermined condition includes one of the following: The received packet is a retransmitted packet; or an automatic repeat request process that is the same as the first predetermined number of the packet exists among currently maintained automatic repeat request processes.

In some embodiments of the present disclosure, whether the received packet is a newly transmitted packet or a retransmitted packet is determined in one of the manners below.

In a first manner, it is determined whether the received packet is a newly transmitted packet or a retransmitted packet according to new-transmission indication information carried in the received packet. In one embodiment, when a newly transmitted packet is indicated in the new-transmission indication information, it is determined that the received packet is a newly transmitted packet; when a retransmitted packet is indicated in the new-transmission indication information, it is determined that the received packet is a retransmitted packet.

In a second manner, it is determined whether the process number carried in the packet is the same as the process number corresponding to an automatic repeat request process which is created or configured. In some embodiments, when the process number carried in the packet is different from the process number corresponding to the automatic repeat request process which is created or configured, it is determined that the received packet is a newly transmitted packet; when the process number carried in the packet is the same as the process number corresponding to the automatic repeat request process which is created or configured, it is determined that the received packet is a retransmitted packet.

In a third manner, it is determined whether the packet number carried in the packet is the same as the packet number corresponding to an automatic repeat request process which is created or configured. In some embodiments, when the packet number carried in the packet is different from the packet number corresponding to the automatic repeat request process which is created or configured, it is determined that the received packet is a newly transmitted packet; when the packet number carried in the packet is the same as the packet number corresponding to the automatic repeat request process which is created or configured, it is determined that the received packet is a retransmitted packet.

In some embodiments of the present disclosure, the lifetime of the automatic repeat request process may be maintained through a timer or a counter.

In some embodiments of the present disclosure, the lifetime includes at least one of: a time length, an end time instant of the lifetime, or a number of times.

In some embodiments of the present disclosure, the time length includes one of: an effective-time length or a remaining-time length.

In some embodiments of the present disclosure, the number of times includes one of: a total number of times of a newly transmitted packet and a retransmitted packet carrying the same first predetermined number as the newly transmitted packet, a total number of remaining times of the newly transmitted packet and the retransmitted packet carrying the same first predetermined number as the newly transmitted packet, a total number of times of the retransmitted packet, or a total number of remaining times of the retransmitted packet.

The effective-time length refers to a time interval from the time when the automatic repeat request process is created or configured to the time when the automatic repeat request process is removed.

The remaining-time length refers to a time interval from the current time to the time when the automatic repeat request process is removed.

The end time instant of the lifetime refers to the time when the automatic repeat request process is removed.

In some embodiments of the present disclosure, when the lifetime is the effective-time length or the remaining-time length, the lifetime of the automatic repeat request process can be maintained through a timer, specifically through by a timing manner or a countdown timing manner. That is, the timer is caused to start timing or countdown timing after the automatic repeat request process is created or configured for the received packet.

When the lifetime is the total number of times of the newly transmitted packet and the retransmitted packet, the total number of remaining times of the newly transmitted packet and the retransmitted packet, the total number of times of the retransmitted packet, or the number of remaining times of the retransmitted packet, the lifetime of the automatic repeat request process can be maintained through a timer, specifically through by a timing manner or a countdown timing manner. That is, the counter is caused to start counting or backward counting after the automatic repeat request process is created or configured for the received packet.

In this embodiment of the present disclosure, the lifetime is obtained in one of the manners below.

In a first manner, the lifetime is obtained according to a second predetermined number of the packet and a mapping between the lifetime and the second predetermined number of the packet.

In a second manner, the lifetime is obtained according to the second predetermined number of the packet and a mapping relationship between the second predetermined number of the packet and one of: the end time instant of the lifetime, the remaining-time length, or the number of remaining times.

In a third manner, the lifetime is obtained according to a lifetime carried in the packet.

In a fourth manner, the lifetime is obtained according to a notified lifetime.

In a fifth manner, the lifetime is obtained according to a negotiated lifetime.

In a sixth manner, the lifetime is obtained according to a preset lifetime.

In some embodiments of the present disclosure, the second predetermined number may be a redundancy version number.

In another embodiment of the present disclosure, the packet is discarded when it is determined that reception of the packet is incorrect, the received packet is a newly transmitted packet, and the first predetermined number carried in the packet cannot be obtained, or when it is determined that reception of the packet is incorrect, the received packet is a retransmitted packet, and the first predetermined number carried in the packet cannot be obtained.

In another embodiment of the present disclosure, the method further includes step 202.

In step 202, the automatic repeat request process is removed or ended when the lifetime of the automatic repeat request process expires.

In another embodiment of the present disclosure, when the lifetime is a time length and the lifetime is maintained by timing, expiration of the lifetime means that the timer reaches the time length indicted by the lifetime.

When the lifetime is an end time instant and the lifetime is maintained by a timing manner, expiration of the lifetime means that the timer reaches the end time.

When the lifetime is the number of times and the lifetime is maintained by a counting manner, expiration of the lifetime means that the counter reaches the number of times indicted by the lifetime.

When the lifetime is the time length and the number of times and the lifetime is maintained by a timing and counting manner, expiration of the lifetime means that one of the following conditions is satisfied: the timer reaches the time length indicted by the lifetime, or the counter reaches the number of times indicted by the lifetime.

When the lifetime is the end time and the number of times and the lifetime is maintained by a timing and counting manner, expiration of the lifetime means that one of the following conditions is satisfied: the timer reaches the end time of the lifetime, or the counter reaches the number of times indicted by the lifetime.

When the lifetime is maintained by a countdown timing manner, expiration of the lifetime means that the timer reaches 0.

When the lifetime is maintained by a backward counting manner, expiration of the lifetime means that the counter reaches 0.

When the lifetime is maintained by a countdown timing and backward counting manner, expiration of the lifetime means that one of the following conditions is satisfied: the timer reaches 0, or the counter reaches 0.

In this embodiment of the present disclosure, the automatic repeat request process corresponding to the first packet or the second packet is removed or ended when the lifetime of the automatic repeat request process expires, so that the automatic repeat request process can be removed in time. In this manner, in the case where a limited number of automatic repeat request processes are simultaneously supported, a new automatic repeat request process can be created for a newly transmitted packet in time, and thus the transmission efficiency is improved.

Figure 4:
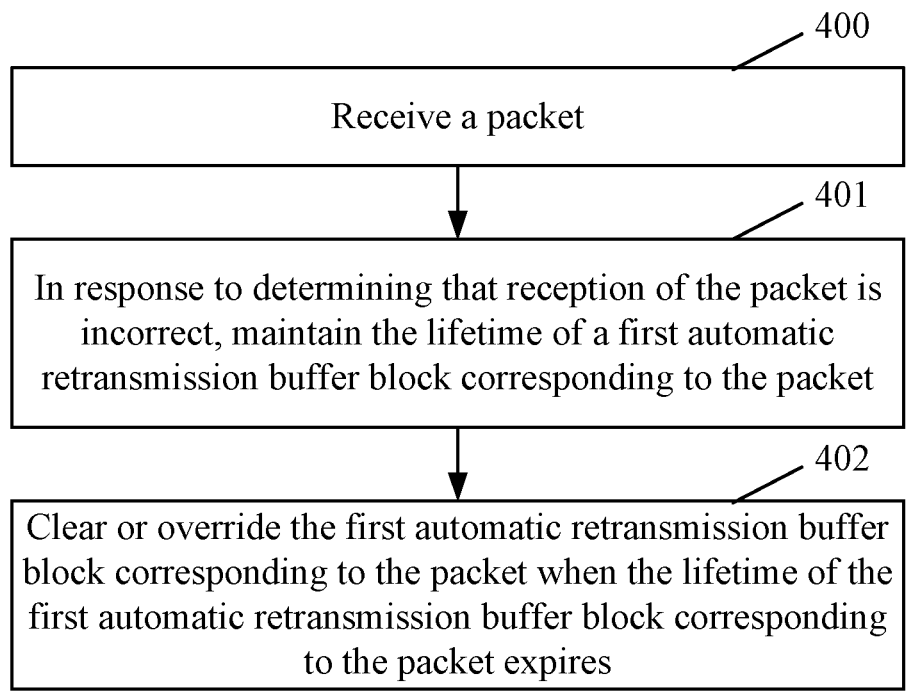
FIG. 4 is a flowchart of a transmission method according to another embodiment of the present disclosure.

Referring to FIG. 4, another embodiment of the present disclosure provides a transmission method. The transmission method includes steps 400 and 401.

In step 400, a packet is received.

In step 401, in response to determining that reception of the packet is incorrect, the lifetime of a first automatic retransmission buffer block corresponding to the packet is maintained.

In another embodiment of the present disclosure, it is feasible to buffer the received packet in the first automatic retransmission buffer block, or it is feasible to combine the received packet with a packet buffered in the first automatic retransmission buffer block and then buffer the combined packet in the first automatic retransmission buffer block.

In some embodiments of the present disclosure, when it is determined that reception of the packet is incorrect, an incorrect-reception acknowledgement frame may be returned or no information is returned; when it is determined that reception of the packet is correct, a correct-reception acknowledgement frame is returned.

In some embodiments of the present disclosure, the lifetime of the first automatic retransmission buffer block corresponding to the packet is maintained in at least one of the manners below.

In response to the packet satisfying a third predetermined condition, the lifetime of the first automatic retransmission buffer block corresponding to the packet starts to be maintained.

In response to the packet satisfying a fourth predetermined condition, the lifetime of the first automatic retransmission buffer block corresponding to the packet continues being maintained.

In response to the packet satisfying the third predetermined condition, the method further includes configuring the lifetime of the first automatic retransmission buffer block for the packet.

In some embodiments of the present disclosure, the third predetermined number includes one of the conditions below.

1. A newly transmitted packet is indicated in new-transmission indication information carried in the packet.

2. A third predetermined number carried in the packet is different from third predetermined numbers carried in packets buffered in all automatic retransmission buffer blocks in an automatic retransmission buffer.

In this embodiment of the present disclosure, the case where the third predetermined number carried in the packet is different from third predetermined numbers carried in packets buffered in all automatic retransmission buffer blocks in the automatic retransmission buffer may include the two cases below.

1. The received packet is a newly transmitted packet.

2. The received packet is a retransmitted packet, but the lifetime of the automatic retransmission buffer block maintained before the packet has ended, that is, the automatic retransmission buffer block has been cleared or overridden.

In some embodiments of the present disclosure, the fourth predetermined number includes one of the conditions below.

1. A retransmitted packet is indicated in new-transmission indication information carried in the packet.

2. A second automatic retransmission buffer block exists in the automatic retransmission buffer.

In some embodiments of the present disclosure, a third predetermined number carried in a packet buffered in the second automatic retransmission buffer block is the same as a third predetermined number carried in the received packet.

In some embodiments of the present disclosure, the third predetermined number includes one of: a packet number or an identifier for a station sending the packet.

In some embodiments of the present disclosure, the identifier for the station includes one of: an association identifier, a partial association identifier, or a media access control (MAC) address.

In some embodiments of the present disclosure, the partial association identifier may be a part of the association identifier or may be calculated from the association identifier.

In some embodiments of the present disclosure, the lifetime of an automatic retransmission buffer block may be maintained by a timing manner or a countdown timing manner.

In some embodiments of the present disclosure, whether the received packet is a newly transmitted packet or a retransmitted packet is determined in one of the manners below.

In a first manner, it is determined whether the received packet is a newly transmitted packet or a retransmitted packet according to new-transmission indication information carried in the received packet. In one embodiment, when a newly transmitted packet is indicated in the new-transmission indication information, it is determined that the received packet is a newly transmitted packet; when a retransmitted packet is indicated in the new-transmission indication information, it is determined that the received packet is a retransmitted packet.

In a second manner, it is determined whether the third predetermined number carried in the received packet is the same as third predetermined numbers carried in packets buffered in automatic retransmission buffer blocks. In some embodiments, when the third predetermined number carried in the packet is different from third predetermined numbers carried in packets buffered in all automatic retransmission buffer blocks, it is determined that the received packet is a newly transmitted packet; when a second automatic retransmission buffer block exists in the automatic retransmission buffer, it is determined that the received packet is a retransmitted packet.

In another embodiment of the present disclosure, the method further includes step 402.

In step 402, the first automatic retransmission buffer block corresponding to the packet is cleared or overridden when the lifetime of the first automatic retransmission buffer block corresponding to the packet expires.

In this embodiment of the present disclosure, an automatic retransmission buffer block is cleared or overridden when the lifetime of the automatic retransmission buffer block expires so that the automatic retransmission buffer block is released in time. In this manner, in the case where there are a limited number of automatic retransmission buffer blocks, a new packet can be buffered in time, and thus the transmission efficiency is improved.

Embodiment One

An intra-BSS station may support one or more automatic repeat request processes simultaneously.

The station maintains one lifetime for each automatic repeat request process. The lifetimes of different automatic repeat request processes may be the same or different.

In some embodiments of the present disclosure, the lifetime may be an effective-time length T, that is, a time interval from the time when the automatic repeat request process is created or configured to the time when the automatic repeat request process is removed. T may be a value notified by an access point, a value negotiated between a non-access point and the access point, a value determined by the non-access point, or a value predefined by a system.

The station may maintain the lifetime by a timing manner or a countdown timing manner.

In this embodiment, the station maintains the lifetime by timing, and the transmission method includes the steps below.

When sender STA1 sends newly transmitted packet 1, STA1 creates or configures an automatic repeat request process for packet 1, and timer t2 corresponding to the automatic repeat request process starts timing.

Before t2 reaches T, when receiving an incorrect-reception acknowledgement frame returned by the receiver of packet 1, STA1 retransmits packet 1 or retransmits packet 2 in one of the manners below. The redundancy version of packet 2 is different from the redundancy version of packet 1.

In a first manner, packet 1 or packet 2 having a different redundancy version than packet 1 is retransmitted when a channel is obtained through a contention access mechanism.

In a second manner, packet 1 or packet 2 having a different redundancy version than packet 1 is retransmitted following a first predetermined time interval after the incorrect-reception acknowledgement frame returned by the receiver is received.

In this method, all time instants within the first predetermined time interval after the incorrect-reception acknowledgement frame returned by the receiver of packet 1 is received are within the lifetime of the automatic repeat request process by default. Therefore, it is considered that the lifetime does not expire after the first predetermined time interval, and packet 1 or packet 2 having a different redundancy version than packet 1 can be retransmitted after the first predetermined time interval.

In a third manner, when all time instant within the first predetermined time interval after the incorrect-reception acknowledgement frame returned by the receiver is received are within the lifetime of the automatic repeat request process, packet 1 or packet 2 having a different redundancy version than packet 1 is retransmitted after the first predetermined time interval after the incorrect-reception acknowledgement frame returned by the receiver is received; when some or all of the time instants within the first predetermined time interval after the incorrect-reception acknowledgement frame returned by the receiver is received are beyond the lifetime of the automatic repeat request process, the lifetime of the automatic repeat request process is extended to a third predetermined time interval that is following the first predetermined time interval after the incorrect-reception acknowledgement frame returned by the receiver is received. The third predetermined time interval is at least a time period required for retransmitting packet 1 or packet 2 having a different redundancy version than packet 1. Packet 1 or packet 2 having a different redundancy version than packet 1 is retransmitted after the first predetermined time interval after the incorrect-reception acknowledgement frame returned by the receiver is received.

Figure 5:
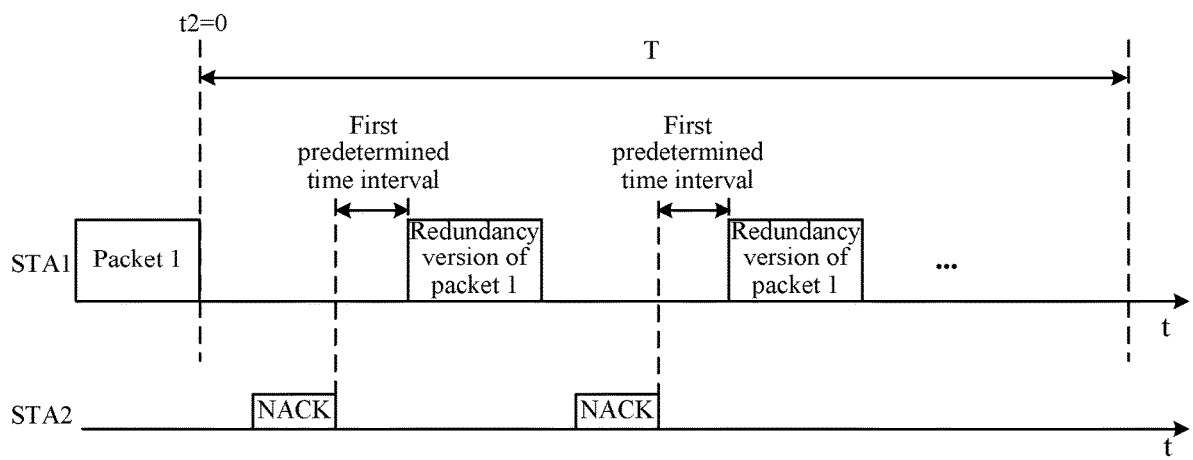
FIG. 5 is schematic diagram one illustrating frame interaction according to an embodiment of the present disclosure.

In the preceding second manner and third manner, the frame interaction process is as shown in FIG. 5.

In a fourth manner, when all time instants within the first predetermined time interval after the incorrect-reception acknowledgement frame returned by the receiver is received are within the lifetime of the automatic repeat request process, packet 1 or packet 2 having a different redundancy version than packet 1 is retransmitted after the first predetermined time interval; when some or all of the time instant within the first predetermined time interval after the incorrect-reception acknowledgement frame returned by the receiver is received are beyond the lifetime of the automatic repeat request process, the automatic repeat request process is removed when the lifetime of the automatic repeat request process expires, that is, packet 1 or packet 2 having a different redundancy version than packet 1 is no longer retransmitted after the first predetermined time interval after the incorrect-reception acknowledgement frame returned by the receiver is received.

In the preceding method, a packet retransmitted one time may have the same redundancy version as or a different redundancy version than a packet retransmitted another time.

When one of the conditions below is satisfied, STA1 stops retransmitting packet 1 or packet 2 having a different redundancy version than packet 1.

A. t2 reaches T.

B. The correct-reception acknowledgement frame returned by the receiver is received.

For example, STA1 maintains a lifetime of 100 ms for each automatic repeat request process, STA1 newly transmits packet 1 to STA2, STA1 configures automatic repeat request process 1 for packet 1, and meanwhile, timer t2 corresponding to automatic repeat request process 1 starts timing: t2=0. When receiving an incorrect-reception acknowledgement frame from STA2, STA1 transmits redundancy version 1 of packet 1 after an interval of SIFS. When receiving an incorrect-reception acknowledgement frame from STA2 once again, STA1 transmits redundancy version 2 of packet 1 after an interval of SIFS. The rest is done in the same manner until one of the conditions below is satisfied. When one of the conditions below is satisfied, STA1 stops retransmitting packet 1 or packet 2 having a different redundancy version than packet 1.

A. t2 reaches 100 ms.

B. The correct-reception acknowledgement frame returned by the receiver is received.

Embodiment Two

An intra-BSS station may support one or more automatic repeat request processes simultaneously.

The station maintains one lifetime for each automatic repeat request process. The lifetimes of different automatic repeat request processes may be the same or different.

In some embodiments of the present disclosure, the lifetime may be an effective-time length T. T may be a value notified by an access point, a value negotiated between a non-access point and the access point, a value determined by the non-access point, or a value predefined by a system.

The station may maintain the lifetime by a timing manner or a countdown timing manner.

In this embodiment, the station maintains the lifetime by timing, and the transmission method includes the steps below.

When sender STA1 sends newly transmitted packet 1, STA1 creates or configures an automatic repeat request process for packet 1, and timer t2 corresponding to the automatic repeat request process starts timing.

Figure 6:
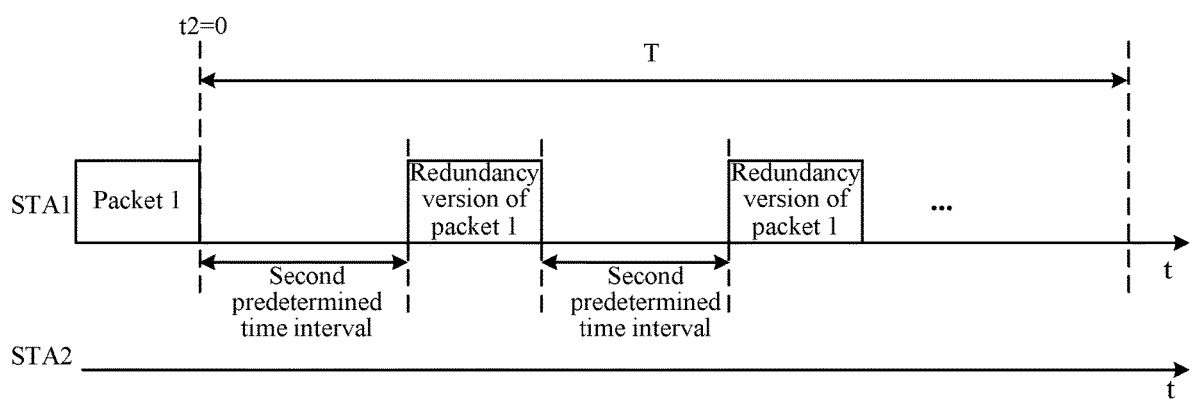
FIG. 6 is schematic diagram two illustrating frame interaction according to an embodiment of the present disclosure.

Before t2 reaches T, when, within a second predetermined time interval, not receiving a correct-reception acknowledgement frame returned by the receiver of packet 1, STA1 retransmits packet 1 or retransmits packet 2 having a different redundancy version than packet 1. If t2 still does not reach T, when, within the second predetermined time interval, not receiving the correct-reception acknowledgement frame returned by the receiver, STA1 retransmits packet 1 or retransmits packet 2 having a different redundancy version than packet 1 and repeats the preceding process before t2 reaches T. The frame interaction process is as shown in FIG. 6.

When one of the conditions below is satisfied, STA1 stops retransmitting packet 1 or packet 2 having a different redundancy version than packet 1.

C. t2 reaches T.

D. The correct-reception acknowledgement frame returned by the receiver is received.

Embodiment Three

An intra-BSS station may support one or more automatic repeat request processes simultaneously.

The station maintains one lifetime for each automatic repeat request process. The lifetimes of different automatic repeat request processes may be the same or different.

In some embodiments of the present disclosure, the lifetime may be an effective-time length T. T may be a value notified by an access point, a value negotiated between a non-access point and the access point, a value determined by the non-access point, or a value predefined by a system.

The station may maintain the lifetime by a timing manner or a countdown timing manner.

In this embodiment, the station maintains the lifetime by timing, and the transmission method includes the steps below.

Receiver STA2 receives a packet and determines that the packet is a newly transmitted packet received incorrectly. STA2 obtains a first predetermined number carried in the packet and starts timer t3 of an automatic repeat request process corresponding to the first predetermined number. When timer t3 reaches T, STA2 removes or ends the automatic repeat request process. The first predetermined number includes at least one of a process number or a packet number.

STA2 determines whether the packet is a newly transmitted packet in, but not limited to, one of the manners below.

1. It is determined whether the packet is a newly transmitted packet according to new-transmission indication information carried in the packet. When a newly transmitted packet is indicated in the new-transmission indication information, it is determined that the packet is a newly transmitted packet; when a retransmitted packet is indicated in the new-transmission indication information, it is determined that the packet is a retransmitted packet.

2. It is determined whether the packet is a newly transmitted packet according to whether the process number carried in the packet is the same as the process number corresponding to a created, configured or currently maintained automatic repeat request process. When the process number carried in the packet is different from the process number corresponding to the automatic repeat request process which is created, configured or currently maintained, it is determined that the packet is a newly transmitted packet; when the process number carried in the packet is the same as the process number corresponding to the automatic repeat request process which is created, configured or currently maintained, it is determined that the packet is a retransmitted packet.

3. It is determined whether the packet is a newly transmitted packet according to whether the packet number carried in the packet is the same as the packet number corresponding to an automatic repeat request process which is created, configured or currently maintained. When the packet number carried in the packet is different from the packet number corresponding to the automatic repeat request process which is created, configured or currently maintained, it is determined that the packet is a newly transmitted packet; when the packet number carried in the packet is the same as the packet number corresponding to the automatic repeat request process which is created, configured or currently maintained, it is determined that the packet is a retransmitted packet.

Embodiment Four

An intra-BSS station may support one or more automatic repeat request processes simultaneously.

The station maintains one lifetime for each automatic repeat request process. The lifetimes of different automatic repeat request processes may be the same or different.

In some embodiments of the present disclosure, a mapping relationship between a lifetime and a second predetermined number include one of:

a mapping relationship is formed between the effective-time length or remaining-time length identifier of the lifetime of an automatic repeat request process, the remaining-time length of the lifetime or the effective-time length of the lifetime of the automatic repeat request process and a second predetermined number; or a mapping relationship is formed between the identifier of the number of uses of the lifetime of an automatic repeat request process, the total number of times or the number of remaining times of the lifetime and a second predetermined number.

In some examples, receiver STA2 receives a packet and obtains a second predetermined number of the packet; according to a mapping relationship between the predefined second predetermined number and the remaining-time length or the end time instant of the lifetime of an automatic repeat request process, when the remaining-time length ends or the end time instant reaches, STA2 removes or ends the automatic repeat request process. The remaining-time length or the end time instant of the lifetime of the automatic repeat request process may be obtained according to the second predetermined number of the packet.

In other examples, receiver STA2 receives a packet and obtains a second predetermined number of the packet; according to a mapping relationship between the predefined second predetermined number and the number of remaining times of the lifetime of an automatic repeat request process, when the total number of times of the received packet or a packet having a different redundancy number than the received packet reaches the number of remaining times, STA2 removes or ends the automatic repeat request process. The number of remaining times of the lifetime of the automatic repeat request process may be obtained according to the second predetermined number of the packet.

For example, a mapping relationship between a second predetermined number and the lifetime of an automatic repeat request process is as listed in Table 1. STA2 receives a packet. STA2 obtains redundancy version number n2 of the packet. According to the mapping relationship between the second predetermined number and the lifetime of the automatic repeat request process, STA2 determines that the lifetime of the automatic repeat request process is V2. Assuming that a remaining-time length is indicated for the lifetime, STA2 starts timing from 0 when receiving the packet and removes or ends the automatic repeat request process corresponding to the packet when the timer reaches V2.

TABLE 1

Mapping relationship between a second predetermined number and the lifetime of an automatic repeat request process

| Second Predetermined Number | Lifetime |
|---|---|
| n1 | V1 |
| n2 | V2 |
| n3 | V3 |
| ... | ... |
| nk | V4 |

Embodiment Five

An intra-BSS station may support one or more automatic repeat request processes simultaneously.

The station maintains one lifetime for each automatic repeat request process. The lifetimes of different automatic repeat request processes may be the same or different.

In some embodiments of the present disclosure, the lifetime may be an effective-time length T.

In a BSS, a sender or a receiver maintains one timer for each automatic repeat request process separately.

The transmission method includes the steps below.

When STA1 newly transmits packet 1, STA1 creates or configures an automatic repeat request process for packet 1 and starts timer t1 corresponding to the automatic repeat request process. When t1 reaches T, STA1 removes the automatic repeat request process corresponding to packet 1.

The preceding process includes, but is not limited to the following operation: When reception of packet 1 is incorrect while the automatic repeat request process is being executed, STA1 retransmits packet 1 or packet 2 having a different redundancy version than packet 1. Packet 2 having a different redundancy version than packet 1 and packet 1 have the same packet number and carry the same valid information but different redundancy information. The valid information is information bits to be transmitted before coding.

Packet 1 or packet 2 having a different redundancy version than packet 1 sent by STA1 in the automatic repeat request process further carry time length information. The time length information is used for indicating the remaining-time length of the lifetime of the automatic repeat request process corresponding to packet 1 or packet 2 having a different redundancy version than packet 1 or indicating the end time of the lifetime of the automatic repeat request process corresponding to packet 1 or packet 2 having a different redundancy version than packet 1.

Receiver STA2 can obtain the remaining-time length upon receiving the preceding packet sent by STA1 or another packet sent by STA1 and having a different redundancy version than the packet. STA2 removes or ends the automatic repeat request process when the remaining-time length is 0.

Alternatively, STA2 can obtain the end time of the lifetime of the automatic repeat request process upon receiving the preceding packet sent by STA1 or another packet sent by STA1 and having a different redundancy version than the packet. STA2 removes or ends the automatic repeat request process when the end time comes.

Embodiment Six

An intra-BSS station may support one or more automatic repeat request processes simultaneously.

The station maintains one lifetime for each automatic repeat request process. The lifetimes of different automatic repeat request processes may be the same or different.

In some embodiments of the present disclosure, the lifetime may be the total number of times of a newly transmitted packet and a retransmitted packet.

In some embodiments of the present disclosure, the newly transmitted packet and the retransmitted packet of the newly transmitted packet have the same packet number, carry the same valid information and carry the same or different redundancy information. The valid information is information bits to be transmitted before coding.

For example, as a receiver, STA1 maintains a lifetime of N times for each automatic repeat request process. That is, the total number of times STA1 receives a packet and a retransmitted packet of the packet is N.

STA1 receives a packet and determines whether the packet is a newly transmitted packet.

A. When it is determined that the packet is a newly transmitted packet, STA1 causes the counter corresponding to the automatic repeat request process corresponding to the first predetermined number of the packet to start counting.

B. When it is determined that the packet is a non-newly transmitted packet, STA1 determines whether the packet is the same as the process number or the packet number corresponding to a certain current automatic repeat request process. When the packet is the same as the process number or the packet number corresponding to the certain current automatic repeat request process, the counter is increased by 1. When the packet is different from the process numbers or the packet numbers corresponding to all current automatic repeat request processes, STA1 causes the counter corresponding to the automatic repeat request process corresponding to the first predetermined number of the packet to start counting.

When the counter reaches N, STA1 removes the corresponding automatic repeat request process.

STA1 determines whether the packet is a newly transmitted packet in, but not limited to, one of the manners below.

1. It is determined whether the packet is a newly transmitted packet according to new-transmission indication information carried in the packet. When a newly transmitted packet is indicated in the new-transmission indication information, it is determined that the packet is a newly transmitted packet; when a retransmitted packet is indicated in the new-transmission indication information, it is determined that the packet is a retransmitted packet.

2. It is determined whether the process number or the packet number carried in the packet is the same as the process number or the packet number corresponding to a currently maintained automatic repeat request process. When the process number (or packet number) carried in the packet is different from the process numbers (or packet numbers) corresponding to all currently maintained automatic repeat request processes, it is determined that the packet is a newly transmitted packet. When the process number (or packet number) carried in the packet is the same as the process number (or packet number) corresponding to a certain currently maintained automatic repeat request process, it is determined that the packet is a retransmitted packet.

Embodiment Seven

An intra-BSS station may support one or more automatic repeat request processes simultaneously. The station maintains one lifetime for each automatic repeat request process. The lifetimes of different automatic repeat request processes may be the same or different.

The lifetime may be the number of remaining times of transmission of a packet and a retransmitted packet of the packet.

In some embodiments of the present disclosure, the packet and the retransmitted packet of the packet carries the same valid information and the same or different redundancy information. The valid information is information bits to be transmitted before coding.

For example, sender STA1 carries a lifetime in a sent packet. The lifetime indicates the number of remaining times of a current packet and a retransmitted packet of the packet. STA1 carries, in a newly transmitted packet, a lifetime indicating that the number of remaining times is N and carries, in a packet transmitted the second time and having the same packet number or a retransmitted packet of the packet, a lifetime indicating that the number of remaining times is (N—1). In this manner, STA2 can carry a lifetime in some or all sent packets having the same packet number or retransmitted packets of the packet.

Receiver STA2 can obtain the lifetime of the automatic repeat request process of a current packet upon receiving one or more of the preceding packets.

Embodiment Eight

In a wireless network, multiple stations (STAs) form one basic service set (BSS).

Figure 3:
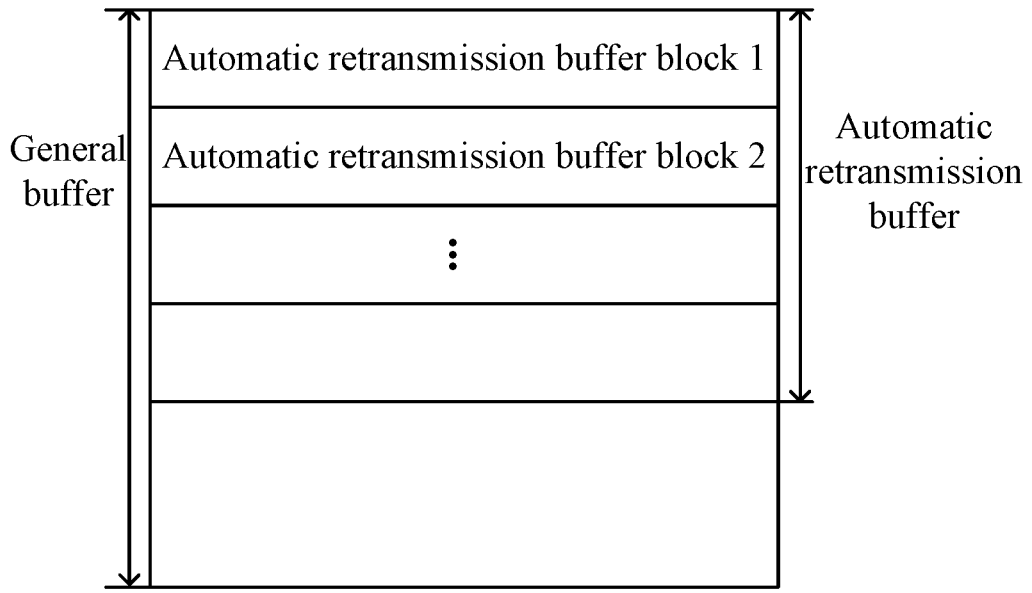
FIG. 3 is a schematic diagram of an automatic retransmission buffer according to an embodiment of the present disclosure.

The general buffer of a station as a receiver contains an automatic retransmission request buffer. The automatic retransmission request buffer is divided into one or more automatic retransmission buffer blocks. The station maintains one timer for each automatic retransmission buffer block. The automatic retransmission request buffer is as shown in FIG. 3.

The station stores packets having the same packet number in the same automatic retransmission buffer block and starts timing from the first packet having a certain packet number in a certain automatic retransmission buffer block. The longest station-supported duration T of a buffered packet having the same packet number is T. T denotes the lifetime of a buffered packet corresponding to a certain packet number in the automatic retransmission buffer block. When T ends, the station clears or overrides the automatic retransmission buffer block and resets the timer corresponding to the automatic retransmission buffer block.

For example, STA1 receives a packet, determines that reception of the packet is incorrect and learns that the packet number of the packet is M.

A. When it is determined that a current packet is a newly transmitted packet, an automatic retransmission buffer block denoted by B1 is configured for buffering the packet, and timer t1 corresponding to B1 starts timing.

B. When it is determined that a current packet is a non-newly transmitted packet, the packet is buffered in the automatic retransmission buffer block (denoted by B2) corresponding to a packet having the same packet number M; or the packet is combined with a packet buffered in B2, and then the combined packet is buffered in B2. B2 corresponds to timer t2.

In some embodiments of the present disclosure, STA1 may, but not necessarily, determine whether a current packet is a newly transmitted packet according to whether there is an automatic retransmission buffer block containing a packet having the same packet number as the current packet: When no automatic retransmission buffer block containing a packet whose packet number is M is in the automatic retransmission request buffer, it is determined that the current packet is a newly transmitted packet. When an automatic retransmission buffer block containing a packet whose packet number is M is in the automatic retransmission request buffer, it is determined that the current packet is a non-newly transmitted packet.

When the timer reaches T, STA1 clears the corresponding automatic retransmission buffer block in the automatic retransmission request buffer and resets the timer. In this example, when t1 reaches T, STA1 clears B1 and resets t1; when t2 reaches T, STA1 clears B2 and resets t2.

When STA1 receives a packet incorrectly, if STA1 does not learn that the packet number of the packet is M, STA1 discards the packet.

Embodiment Nine

When receiving a packet correctly and learning that the packet number of the packet is N, STA1 performs the operations below.

A. When it is determined that the packet is a newly transmitted packet, that is, when no packet whose packet number is N is buffered in the automatic retransmission request buffer, no operation is performed on the automatic retransmission request buffer of STA1.

B. When it is determined that the packet is not a newly transmitted packet, that is, when a packet whose packet number is N is buffered in the automatic retransmission request buffer, STA1 clears B3 and resets the timer corresponding to B3. B3 denotes the automatic retransmission buffer block containing the packet whose packet number is N in the automatic retransmission request buffer.

Embodiment Ten

The general buffer of an intra-BSS station as a receiver contains an automatic retransmission request buffer. The automatic retransmission request buffer is divided into one or more automatic retransmission buffer blocks. The station maintains one timer for each automatic retransmission buffer block.

The station places packets from the same sender in the same buffer block. The sender is identified by an association identifier, a partial association identifier, or a MAC address carried in a packet. Here the association identifier, the partial association identifier, or the MAC address is referred to as a station identifier (STA identifier (SID)).

The station starts timing from the first packet having an SID in a certain automatic retransmission buffer block. The longest station-supported duration T of a buffered packet having the same SID is T. T denotes the lifetime of a buffered packet corresponding to an SID in the automatic retransmission buffer block. When T ends, the station clears or overrides the automatic retransmission buffer block and resets the timer corresponding to the automatic retransmission buffer block.

For example, STA1 receives multiple packets from multiple stations simultaneously. The SIDs of the multiple stations are k1, k2, . . . , and kn, respectively. STA1 determines whether each packet is received correctly separately. When a packet is received incorrectly, STA1 buffers the incorrectly received packet in the automatic retransmission buffer block corresponding to the SID of the station sending the packet.

For example, when receiving a packet sent by the station whose station identifier is k1 and determining that reception of the packet is incorrect, STA1 performs the operations below.

A. If no packet from the station identified as k1 is buffered in the current automatic retransmission request buffer, STA1 buffers a currently received packet in automatic retransmission buffer block Bi, and timer t1 corresponding to Bi starts timing.

B. If a packet from the station identified as k1 is buffered in automatic retransmission buffer block Bk in the current automatic retransmission request buffer and timer t2 corresponding to Bk does not reach T, STA1 buffers a currently received packet in Bk.

When the timer reaches T, STA1 clears or overrides the corresponding automatic retransmission buffer block in the automatic retransmission request buffer and resets the timer.

For example, when t1 reaches T, STA1 clears Bi and resets t1.

Embodiment Eleven

The station maintains one lifetime for each automatic repeat request process. The lifetimes of different automatic repeat request processes may be the same or different.

The lifetime is jointly indicated by time length information and the number of times of transmission. That is, the automatic repeat request process is removed or ended when one of the conditions below is satisfied.

1. The timer reaches the end time instant of the lifetime indicated by the time length information or reaches the calculated end time of the lifetime.

2. The timer reaches the end time instant of the lifetime indicated by the number of times of transmission or reaches the calculated end time of the lifetime.

For example, a packet or a different redundancy version of the packet sent by a sender carries lifetime information that includes the remaining-time length T and the number of remaining times of transmission of a current automatic repeat request process.

A receiver receives the packet, obtains T and N, and performs counting and timing through a counter and a timer respectively. When either the counter or the timer expires, the receiver removes the automatic repeat request process. For example, when the backward counting reaches 0, but the countdown timing does not reach 0, the receiver removes the automatic repeat request process. Alternatively, when the countdown timing reaches 0, but the backward counting does not reach 0, the receiver removes the automatic repeat request process.

Figure 7:
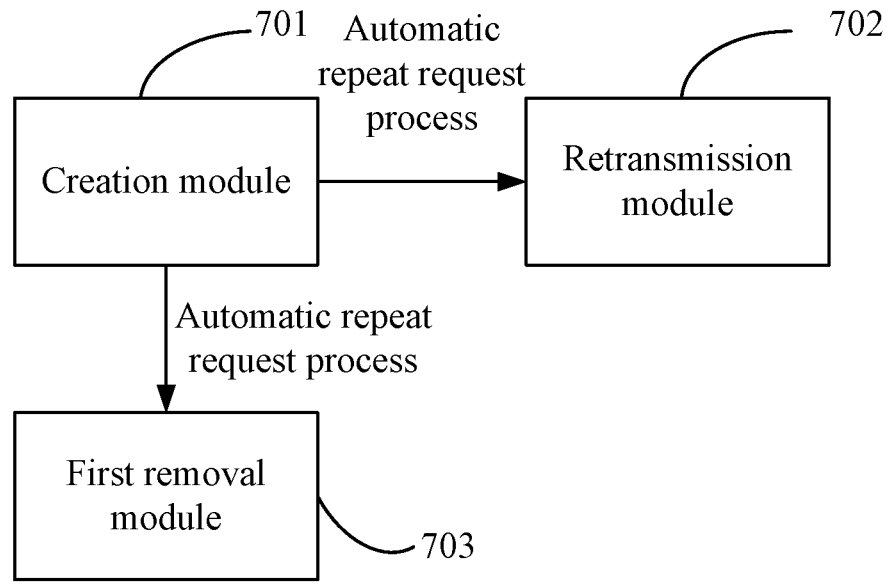
FIG. 7 is a schematic diagram illustrating a structure of a transmission apparatus according to another embodiment of the present disclosure.

Referring to FIG. 7, another embodiment of the present disclosure provides a transmission apparatus. The transmission apparatus includes a creation module 701.

The creation module 701 is configured to create an automatic repeat request process for a first packet, set a lifetime for the automatic repeat request process and send the first packet.

In some embodiments of the present disclosure, the creation module 701 may create the automatic repeat request process for the first packet before, when or after the first packet is sent. That is, the time when the automatic repeat request process of the first packet is created is acceptable as long as the absolute value of the difference between the time when the first packet is sent and the time when the automatic repeat request process of the first packet is created is within a predetermined time threshold.

In some embodiments of the present disclosure, the first packet may be a newly transmitted packet or a retransmitted packet. This is not limited in this embodiment of the present disclosure.

In some embodiments of the present disclosure, the creation module 701 is further configured to start to maintain the lifetime of the automatic repeat request process.

In some embodiments of the present disclosure, the creation module 701 may maintain the lifetime of the automatic repeat request process through a timer or a counter.

In some embodiments of the present disclosure, the lifetime includes at least one of: a time length, an end time instant of the lifetime, or a number of times.

In some embodiments of the present disclosure, the time length includes one of: an effective-time length or a remaining-time length.

In some embodiments of the present disclosure, the number of times includes one of: a total number of times of a newly transmitted packet and a retransmitted packet carrying the same first predetermined number as the newly transmitted packet, a total number of remaining times of the newly transmitted packet and the retransmitted packet carrying the same first predetermined number as the newly transmitted packet, a total number of times of the retransmitted packet, or a number of remaining times of the retransmitted packet.

The effective-time length refers to a time interval from the time when the automatic repeat request process is created or configured to the time when the automatic repeat request process is removed.

The remaining-time length refers to a time interval from the current time to the time when the automatic repeat request process is removed.

The end time instant of the lifetime refers to the time when the automatic repeat request process is removed.

In some embodiments of the present disclosure, when the lifetime is the effective-time length or the remaining-time length, it is feasible to maintain the lifetime of the automatic repeat request process by timing or countdown timing through a timer.

When the lifetime is the total number of times of the newly transmitted packet and the retransmitted packet, the total number of remaining times of the newly transmitted packet and the retransmitted packet, the total number of times of the retransmitted packet, or the number of remaining times of the retransmitted packet, it is feasible to maintain the lifetime of the automatic repeat request process by timing or countdown timing through a timer.

In this embodiment of the present disclosure, the time when the creation module 701 starts to maintain the lifetime of the automatic repeat request process is not limited. For example, the creation module 701 may start to maintain the lifetime of the automatic repeat request process when the lifetime of the automatic repeat request process is set.

In another embodiment of the present disclosure, the transmission apparatus further includes a retransmission module 702.

The retransmission module 702 is configured to, in response to satisfying a preset retransmission condition in the lifetime of the automatic repeat request process, retransmit a second packet, where the first packet and the second packet carry the same first predetermined number.

In this embodiment of the present disclosure, in the process in which the retransmission module 702 determines whether the preset retransmission condition is satisfied in the lifetime of the automatic repeat request process and the process in which the retransmission module 702 retransmits the second packet, the creation module 701 continues maintaining the lifetime of the automatic repeat request process.

In some embodiments of the present disclosure, the first predetermined number includes at least one of: a process number or a packet number.

In this embodiment of the present disclosure, the creation module 701, the retransmission module 702, and a first removal module 703 may obtain the lifetime in one of the manners below.

In a first manner, the lifetime is obtained according to a second predetermined number of the packet and a mapping relationship between the lifetime and the second predetermined number of the packet.

In a second manner, the lifetime is obtained according to the second predetermined number of the packet and a mapping between the second predetermined number of the packet and one of the end time instant of the lifetime, a remaining-time length, or the number of remaining times.

In a third manner, the lifetime is obtained according to a notified lifetime.

In a fourth manner, the lifetime is obtained according to a negotiated lifetime.

In a fifth manner, the lifetime is obtained according to a preset lifetime.

In some embodiments of the present disclosure, the second predetermined number may be a redundancy version number.

In this embodiment of the present disclosure, the preset retransmission condition includes at least one of the conditions below.

1. An incorrect-reception acknowledgement frame returned by a receiver is received.
2. The time when a channel is obtained through a contention access mechanism is in the lifetime of the automatic repeat request process.
3. All time instants within a first predetermined time interval after the incorrect-reception acknowledgement frame returned by the receiver is received are within the lifetime of the automatic repeat request process.
4. The acknowledgement frame returned by the receiver is not received within a second predetermined time interval. The acknowledgement frame includes a correct-reception acknowledgement frame or an incorrect-reception acknowledgement frame.

In some embodiments of the present disclosure, when the incorrect-reception acknowledgement frame returned by the receiver is received, the retransmission module 702 may retransmit the second packet using one of the methods below.

In a first method, the second packet is retransmitted after the first predetermined time interval (for example, Short Interframe Space (SIFS)) after the incorrect-reception acknowledgement frame returned by the receiver is received.

In this method, all time instants within a first predetermined time interval after the incorrect-reception acknowledgement frame returned by the receiver is received are in the lifetime of the automatic repeat request process by default. Therefore, it is considered that the lifetime does not expire after the first predetermined time interval, and the second packet can be retransmitted after the first predetermined time interval.

In a second method, the second packet is retransmitted after the incorrect-reception acknowledgement frame returned by the receiver is received, within the lifetime, and when the channel is obtained through the contention access mechanism.

In a third method, when all time instants within the first predetermined time interval after the incorrect-reception acknowledgement frame returned by the receiver is received are in the lifetime of the automatic repeat request process, the second packet is retransmitted following the first predetermined time interval after the incorrect-reception acknowledgement frame returned by the receiver is received; when some or all of the time instants within the first predetermined time interval after the incorrect-reception acknowledgement frame returned by the receiver is received are beyond the lifetime of the automatic repeat request process, the lifetime of the automatic repeat request process is extended to a third predetermined time interval that is after the first predetermined time interval after the incorrect-reception acknowledgement frame returned by the receiver is received. The third predetermined time interval is at least a time required for retransmitting the second packet. The second packet is retransmitted after the first predetermined time interval after the incorrect-reception acknowledgement frame returned by the receiver is received.

In a fourth method, when all time instants within the first predetermined time interval after the incorrect-reception acknowledgement frame returned by the receiver is received are within the lifetime of the automatic repeat request process, the second packet is retransmitted after the first predetermined time interval after the incorrect-reception acknowledgement frame returned by the receiver is received; when some or all of the time instants within the first predetermined time interval after the incorrect-reception acknowledgement frame returned by the receiver is received are beyond the lifetime of the automatic repeat request process, the automatic repeat request process is removed when the lifetime of the automatic repeat request process expires, that is, the second packet is no longer retransmitted after the first predetermined time interval after the incorrect-reception acknowledgement frame returned by the receiver is received.

In some embodiments of the present disclosure, the first packet or the second packet further carries at least one of: a lifetime, an end time of instant the lifetime, a remaining-time length, or a number of remaining times.

In some embodiments of the present disclosure, the second packet is the same as the first packet, or the redundancy version of the second packet is different from the redundancy version of the first packet.

In another embodiment of the present disclosure, the transmission apparatus further includes a first removal module 703.

The first removal module 703 is configured to remove or end the automatic repeat request process when the lifetime of the automatic repeat request process expires or a correct-reception acknowledgement frame returned by a receiver is received.

In another embodiment of the present disclosure, when the lifetime is a time length and the lifetime is maintained by a timing manner, expiration of the lifetime means that the timer reaches the time length indicted by the lifetime.

When the lifetime is an end time and the lifetime is maintained by a timing manner, expiration of the lifetime means that the timer reaches the end time.

When the lifetime is the number of times and the lifetime is maintained by a counting manner, expiration of the lifetime means that the counter reaches the number of times indicted by the lifetime.

When the lifetime is the time length and the number of times and the lifetime is maintained by a timing and counting manner, expiration of the lifetime means that one of the following conditions is satisfied: the timer reaches the time length indicted by the lifetime, or the counter reaches the number of times indicted by the lifetime.

When the lifetime is the end time instant and the number of times and the lifetime is maintained by a timing and counting manner, expiration of the lifetime means that one of the following conditions is satisfied: the timer reaches the end time of the lifetime, or the counter reaches the number of times indicted by the lifetime.

When the lifetime is maintained by a countdown timing manner, expiration of the lifetime means that the timer reaches 0.

When the lifetime is maintained by a backward counting manner, expiration of the lifetime means that the counter reaches 0.

When the lifetime is maintained by a countdown timing and backward counting manner, expiration of the lifetime means that one of the following conditions is satisfied: The timer reaches 0, or the counter reaches 0.

In this embodiment of the present disclosure, the first removal module 703 is used for removing or ending the automatic repeat request process in at least one of the manners below.

1. The first packet is stopped from being sent or the second packet is stopped from being retransmitted.

2. A packet carrying the first predetermined number is stopped from being sent.

3. The first packet is stopped from being sent through an automatic repeat request mechanism or the second packet is stopped from being retransmitted through the automatic repeat request mechanism.

In this embodiment of the present disclosure, the automatic repeat request process corresponding to the first packet or the second packet is removed or ended when the lifetime of the automatic repeat request process expires or the correct-reception acknowledgement frame returned by the receiver is received. In this manner, in the case where a limited number of automatic repeat request processes are simultaneously supported, a new automatic repeat request process can be created for a newly transmitted packet in time, and thus the transmission efficiency is improved.

Figure 8:
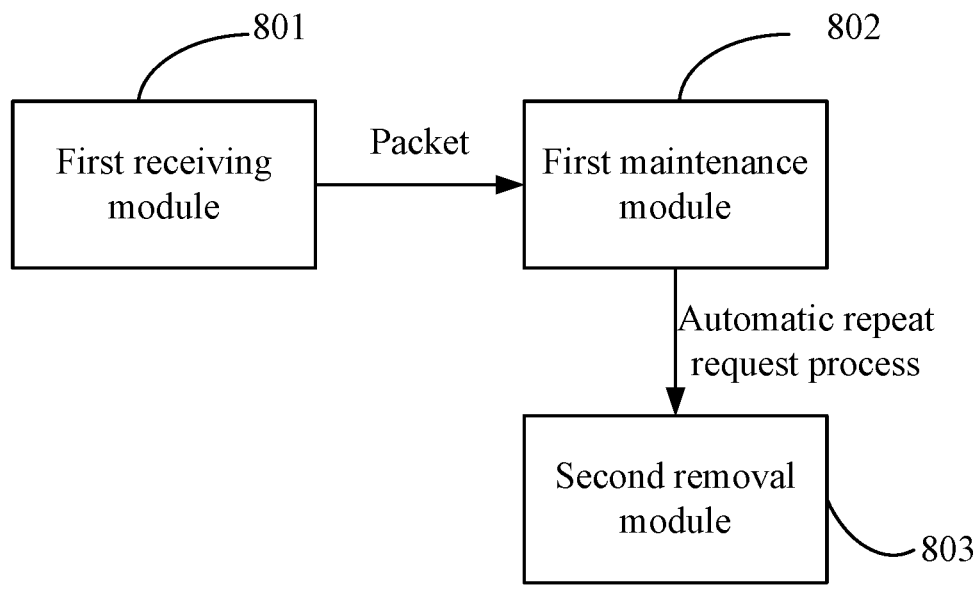
FIG. 8 is a schematic diagram illustrating a structure of a transmission apparatus according to another embodiment of the present disclosure.

Referring to FIG. 8, another embodiment of the present disclosure provides a transmission apparatus. The transmission apparatus includes a first receiving module 801 and a first maintenance module 802.

The first receiving module 801 is configured to receive a packet.

The first maintenance module 802 is configured to, in response to determining that reception of the packet is incorrect and obtaining a first predetermined number carried in the packet, maintain the lifetime of an automatic repeat request process corresponding to the first predetermined number.

In another embodiment of the present disclosure, the transmission apparatus further includes a second removal module 803.

The second removal module 803 is configured to remove or end the automatic repeat request process when the lifetime of the automatic repeat request process expires.

In some embodiments of the present disclosure, the first predetermined number includes at least one of: a process number or a packet number.

In some embodiments of the present disclosure, when it is determined that reception of the packet is incorrect, an incorrect-reception acknowledgement frame may be returned or no information is returned; when it is determined that reception of the packet is correct, a correct-reception acknowledgement frame is returned.

In this embodiment of the present disclosure, the first maintenance module 802 is configured to maintain the lifetime of the automatic repeat request process corresponding to the first predetermined number in at least one of the manners below.

In a first manner, in response to the received packet satisfying a first predetermined condition, the lifetime of the automatic repeat request process corresponding to the first predetermined number starts to be maintained. When the lifetime of the automatic repeat request process is maintained through a timer, the timer may be caused to start timing or countdown timing. When the lifetime of the automatic repeat request process is maintained through a counter, the counter may be caused to start counting or backward counting.

In a second manner, in response to the received packet satisfying a second predetermined condition, the lifetime of the automatic repeat request process that is the same as the first predetermined number of the packet continues being maintained. When the lifetime of the automatic repeat request process is maintained through a timer, the timer may be caused to continue timing or countdown timing or may be caused to perform timing or countdown timing according to a regained lifetime. When the lifetime of the automatic repeat request process is maintained through a counter, the counter may be caused to start counting or backward counting or may be caused to perform counting or backward counting according to a regained lifetime.

In some embodiments of the present disclosure, the first predetermined condition includes one of the following: The received packet is a newly transmitted packet; or the first predetermined number of the received packet is different from first predetermined numbers corresponding to all currently maintained automatic repeat request processes.

The second predetermined condition includes one of the following: the received packet is a retransmitted packet; or an automatic repeat request process that is the same as the first predetermined number of the packet exists among currently maintained automatic repeat request processes.

In this embodiment of the present disclosure, the first maintenance module 802 is used for determining whether the received packet is a newly transmitted packet or a retransmitted packet in one of the manners below.

In a first manner, it is determined whether the received packet is a newly transmitted packet or a retransmitted packet according to new-transmission indication information carried in the received packet. In some embodiments, when a newly transmitted packet is indicated in the new-transmission indication information, it is determined that the received packet is a newly transmitted packet; when a retransmitted packet is indicated in the new-transmission indication information, it is determined that the received packet is a retransmitted packet.

In a second manner, it is determined whether the process number carried in the packet is the same as the process number corresponding to a automatic repeat request process which is created or configured. In some embodiments, when the process number carried in the packet is different from the process number corresponding to the automatic repeat request process which is created or configured, it is determined that the received packet is a newly transmitted packet; when the process number carried in the packet is the same as the process number corresponding to the automatic repeat request process which is created or configured, it is determined that the received packet is a retransmitted packet.

In a third manner, it is determined whether the packet number carried in the packet is the same as the packet number corresponding to an automatic repeat request process which is created or configured. In some embodiments, when the packet number carried in the packet is different from the packet number corresponding to the automatic repeat request process which is created or configured, it is determined that the received packet is a newly transmitted packet; when the packet number carried in the packet is the same as the packet number corresponding to the automatic repeat request process which is created or configured, it is determined that the received packet is a retransmitted packet.

In some embodiments of the present disclosure, the first maintenance module 802 may maintain the lifetime of the automatic repeat request process through a timer or a counter.

The lifetime includes at least one of: a time length, an end time instant of the lifetime, or a number of times.

In some embodiments of the present disclosure, the time length includes one of: an effective-time length or a remaining-time length.

In some embodiments of the present disclosure, the number of times includes one of: a total number of times of a newly transmitted packet and a retransmitted packet carrying the same first predetermined number as the newly transmitted packet, a total number of remaining times of the newly transmitted packet and the retransmitted packet carrying the same first predetermined number as the newly transmitted packet, a total number of times of the retransmitted packet, or a number of remaining times of the retransmitted packet.

The effective-time length refers to the time interval from the time when the automatic repeat request process is created or configured to the time when the automatic repeat request process is removed.

The remaining-time length refers to the time interval from the current time to the time when the automatic repeat request process is removed.

The end time instant of the lifetime refers to the time when the automatic repeat request process is removed.

In some embodiments of the present disclosure, when the lifetime is the effective-time length or the remaining-time length, it is feasible to maintain the lifetime of the automatic repeat request process by timing or countdown timing through a timer. That is, the timer is caused to start timing or countdown timing after the automatic repeat request process is created or configured for the received packet.

When the lifetime is the total number of times of the newly transmitted packet and the retransmitted packet, the total number of remaining times of the newly transmitted packet and the retransmitted packet, the total number of times of the retransmitted packet, or the number of remaining times of the retransmitted packet, it is feasible to maintain the lifetime of the automatic repeat request process by timing or countdown timing through a timer. That is, the counter is caused to start counting or backward counting after the automatic repeat request process is created or configured for the received packet.

In some embodiments of the present disclosure, the first maintenance module 802 and the second removal module 803 may obtain the lifetime in one of the manners below.

In a first manner, the lifetime is obtained according to a second predetermined number of the packet and a mapping relationship between the lifetime and the second predetermined number of the packet.

In a second manner, the lifetime is obtained according to the second predetermined number of the packet and a mapping relationship between the second predetermined number of the packet and one of: an end time instant of the lifetime, a remaining-time length, or a number of remaining times.

In a third manner, the lifetime is obtained according to a lifetime carried in the packet.

In a fourth manner, the lifetime is obtained according to a notified lifetime.

In a fifth manner, the lifetime is obtained according to a negotiated lifetime.

In a sixth manner, the lifetime is obtained according to a preset lifetime.

In some embodiments of the present disclosure, the second predetermined number may be a redundancy version number.

In another embodiment of the present disclosure, when the lifetime is a time length and the lifetime is maintained by timing, expiration of the lifetime means that the timer reaches the time length indicted by the lifetime.

When the lifetime is an end time and the lifetime is maintained by a timing manner, expiration of the lifetime means that the timer reaches the end time.

When the lifetime is the number of times and the lifetime is maintained by a counting manner, expiration of the lifetime means that the counter reaches the number of times indicted by the lifetime.

When the lifetime is the time length and the number of times and the lifetime is maintained by a timing and counting manner, expiration of the lifetime means that one of the following conditions is satisfied: the timer reaches the time length indicted by the lifetime, or the counter reaches the number of times indicted by the lifetime.

When the lifetime is the end time and the number of times and the lifetime is maintained by a timing and counting manner, expiration of the lifetime means that one of the following conditions is satisfied: the timer reaches the end time of the lifetime, or the counter reaches the number of times indicted by the lifetime.

When the lifetime is maintained by a countdown timing manner, expiration of the lifetime means that the timer reaches 0.

When the lifetime is maintained by a backward counting manner, expiration of the lifetime means that the counter reaches 0.

When the lifetime is maintained by a countdown timing and backward counting manner, expiration of the lifetime means that one of the following conditions is satisfied: the timer reaches 0, or the counter reaches 0.

In another embodiment of the present disclosure, the first maintenance module 802 is further used for discarding the packet when it is determined that reception of the packet is incorrect, the received packet is a newly transmitted packet, and the first predetermined number carried in the packet cannot be obtained; or when it is determined that reception of the packet is incorrect, the received packet is a retransmitted packet, and the first predetermined number carried in the packet cannot be obtained.

In this embodiment of the present disclosure, the automatic repeat request process corresponding to the first packet or the second packet is removed or ended when the lifetime of the automatic repeat request process expires. In this manner, in the case where a limited number of automatic repeat request processes are simultaneously supported, a new automatic repeat request process can be created for a newly transmitted packet in time, and thus the transmission efficiency is improved.

Figure 9:
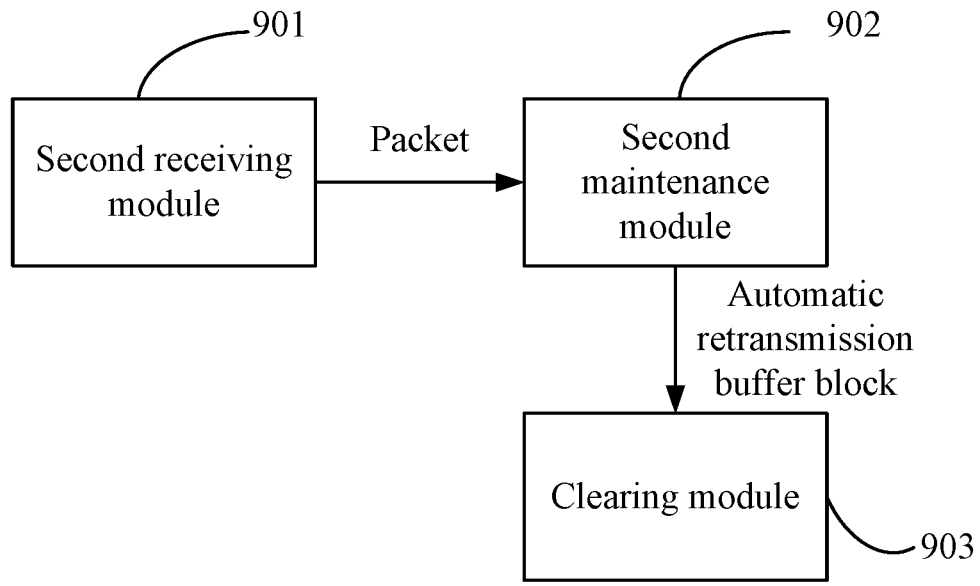
FIG. 9 is a schematic diagram illustrating a structure of a transmission apparatus according to another embodiment of the present disclosure.

Referring to FIG. 9, another embodiment of the present disclosure provides a transmission apparatus. The transmission apparatus includes a second receiving module 901 and a second maintenance module 902.

The second receiving module 901 is configured to receive a packet.

The second maintenance module 902 is configured to, in response to determining that reception of the packet is incorrect, maintain the lifetime of a first automatic retransmission buffer block corresponding to the packet.

In another embodiment of the present disclosure, the second maintenance module 902 is further configured to buffer the received packet in the first automatic retransmission buffer block or configured to combine the received packet with a packet buffered in the first automatic retransmission buffer block and then buffer the combined packet in the first automatic retransmission buffer block.

In this embodiment of the present disclosure, when it is determined that reception of the packet is incorrect, an incorrect-reception acknowledgement frame may be returned or no information is returned; when it is determined that reception of the packet is correct, a correct-reception acknowledgement frame is returned.

In this embodiment of the present disclosure, the second maintenance module 902 is configured to maintain the lifetime of the first automatic retransmission buffer block corresponding to the packet in at least one of the manners below.

In a first manner, in response to the packet satisfying a third predetermined condition, the lifetime of the first automatic retransmission buffer block corresponding to the packet starts to be maintained.

In a second manner, in response to the packet satisfying a fourth predetermined condition, the lifetime of the first automatic retransmission buffer block corresponding to the packet continues being maintained.

In a third manner, in response to the packet satisfying the third predetermined condition, the method further includes configuring the lifetime of the first automatic retransmission buffer block for the packet.

In this embodiment of the present disclosure, the third predetermined number includes one of the following conditions: A newly transmitted packet is indicated in new-transmission indication information carried in the packet; or a third predetermined number carried in the packet is different from third predetermined numbers carried in packets buffered in all automatic retransmission buffer blocks in an automatic retransmission buffer.

In this embodiment of the present disclosure, the case where the third predetermined number carried in the packet is different from third predetermined numbers carried in packets buffered in all automatic retransmission buffer blocks in the automatic retransmission buffer may include the two cases below.

1. The received packet is a newly transmitted packet.

2. The received packet is a retransmitted packet, but the lifetime of the automatic retransmission buffer block maintained before the packet has ended, that is, the automatic retransmission buffer block has been cleared or overridden.

In some embodiments of the present disclosure, the fourth predetermined number includes one of the conditions below.

1. A retransmitted packet is indicated in new-transmission indication information carried in the packet.

2. A second automatic retransmission buffer block exists in the automatic retransmission buffer.

In some embodiments of the present disclosure, a third predetermined number carried in a packet buffered in the second automatic retransmission buffer block is the same as a third predetermined number carried in the received packet.

In some embodiments of the present disclosure, the third predetermined number includes one of a packet number or a identifier for a station sending the packet.

In some embodiments of the present disclosure, the identifier for a station includes one of an association identifier, a partial association identifier, or a MAC address.

In this embodiment of the present disclosure, the second maintenance module 902 is configured to determine whether the received packet is a newly transmitted packet or a retransmitted packet in one of the manners below.

In a first manner, it is determined whether the received packet is a newly transmitted packet or a retransmitted packet according to new-transmission indication information carried in the received packet. In one embodiment, when a newly transmitted packet is indicated in the new-transmission indication information, it is determined that the received packet is a newly transmitted packet; when a retransmitted packet is indicated in the new-transmission indication information, it is determined that the received packet is a retransmitted packet.

In a second manner, it is determined whether the third predetermined number carried in the received packet is the same as third predetermined numbers carried in packets buffered in automatic retransmission buffer blocks. In some embodiments, when the third predetermined number carried in the packet is different from third predetermined numbers carried in packets buffered in all automatic retransmission buffer blocks, it is determined that the received packet is a newly transmitted packet; when a second automatic retransmission buffer block exists in the automatic retransmission buffer, it is determined that the received packet is a retransmitted packet.

In this embodiment of the present disclosure, the second maintenance module 902 may maintain the lifetime of an automatic retransmission buffer block by a timing manner or a countdown timing manner.

In this embodiment of the present disclosure, the transmission apparatus further includes a clearing module 903.

The clearing module 903 is configured to clear or override the first automatic retransmission buffer block corresponding to the packet when the lifetime of the first automatic retransmission buffer block corresponding to the packet expires.

In this embodiment of the present disclosure, an automatic retransmission buffer block is cleared or overridden when the lifetime of the automatic retransmission buffer block expires so that the automatic retransmission buffer block is released in time. In this manner, in the case where there are a limited number of automatic retransmission buffer blocks, a new packet can be buffered in time, and thus the transmission efficiency is improved.

Another embodiment of the present disclosure provides a transmission apparatus. The transmission apparatus includes a processor and a computer-readable storage medium storing instructions. The processor executes the instructions to perform any preceding transmission method.

Another embodiment of the present disclosure provides a computer-readable storage medium storing a computer program. When the computer program is executed by a processor, any preceding transmission method is performed.

Figure 10:
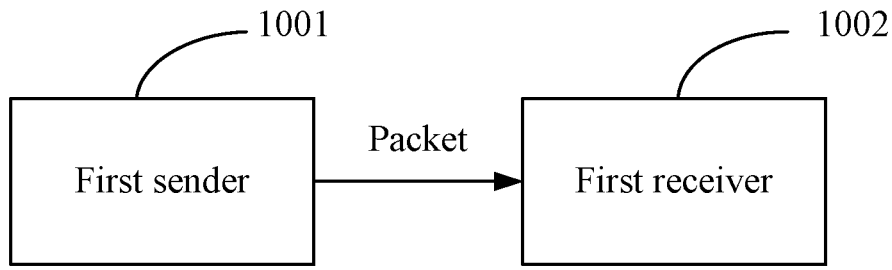
FIG. 10 is a schematic diagram illustrating a structure of a transmission system according to another embodiment of the present disclosure.

Referring to FIG. 10, another embodiment of the present disclosure provides a transmission system. The transmission system includes a first sender 1001 and a first receiver 1002.

The first sender 1001 is configured to create an automatic repeat request process for a first packet, set a lifetime for the automatic repeat request process and send the first packet.

The first receiver 1002 is configured to receive a packet, and in response to determining that reception of the packet is incorrect and obtaining a first predetermined number carried in the packet, maintain the lifetime of an automatic repeat request process corresponding to the first predetermined number.

In this embodiment of the present disclosure, the first sender 1001 may create the automatic repeat request process for the first packet before, when or after the first packet is sent. That is, the time when the first sender 1001 creates the automatic repeat request process of the first packet is acceptable as long as the absolute value of the difference between the time when the first sender 1001 sends the automatic repeat request process of the first packet and the time when the first sender 1001 creates the automatic repeat request process of the first packet is within a predetermined time threshold.

In this embodiment of the present disclosure, the first packet may be a newly transmitted packet or a retransmitted packet. This is not limited in this embodiment of the present disclosure.

In another embodiment of the present disclosure, the first sender 1001 is further configured to start to maintain the lifetime of the automatic repeat request process.

In this embodiment of the present disclosure, the first sender 1001 and the first receiver 1002 may maintain the lifetime of the automatic repeat request process through a timer or a counter.

In some embodiments of the present disclosure, the lifetime includes at least one of a time length, an end time instant of the lifetime, or a number of times.

In some embodiments of the present disclosure, the time length includes one of an effective-time length or a remaining-time length.

In some embodiments of the present disclosure, the number of times includes one of: a total number of times of a newly transmitted packet and a retransmitted packet carrying the same first predetermined number as the newly transmitted packet, a total number of remaining times of the newly transmitted packet and the retransmitted packet carrying the same first predetermined number as the newly transmitted packet, a total number of times of the retransmitted packet, or a number of remaining times of the retransmitted packet.

The effective-time length refers to the time interval from the time when the automatic repeat request process is created or configured to the time when the automatic repeat request process is removed.

The remaining-time length refers to the time interval from the current time to the time when the automatic repeat request process is removed.

The end time instant of the lifetime refers to the time when the automatic repeat request process is removed.

In some embodiments of the present disclosure, when the lifetime is the effective-time length or the remaining-time length, it is feasible to maintain the lifetime of the automatic repeat request process by timing or countdown timing through a timer.

When the lifetime is the total number of times of the newly transmitted packet and the retransmitted packet, the total number of remaining times of the newly transmitted packet and the retransmitted packet, the total number of times of the retransmitted packet, or the number of remaining times of the retransmitted packet, it is feasible to maintain the lifetime of the automatic repeat request process by timing or countdown timing through a timer.

In this embodiment of the present disclosure, the time when the lifetime of the automatic repeat request process starts to be maintained is not limited. For example, the lifetime of the automatic repeat request process may start to be maintained when the lifetime of the automatic repeat request process is set.

In this embodiment of the present disclosure, the first sender 1001 may obtain the lifetime in one of the manners below.

In a first manner, the lifetime is obtained according to a second predetermined number of the packet and a mapping relationship between the lifetime and the second predetermined number of the packet.

In a second manner, the lifetime is obtained according to the second predetermined number of the packet and a mapping relationship between the second predetermined number of the packet and one of the end time instant of the lifetime, a remaining-time length, or the number of remaining times.

In a third manner, the lifetime is obtained according to a notified lifetime.

In a fourth manner, the lifetime is obtained according to a negotiated lifetime.

In a fifth manner, the lifetime is obtained according to a preset lifetime.

In some embodiments of the present disclosure, the second predetermined number may be a redundancy version number.

In another embodiment of the present disclosure, the first sender 1001 is further configured to, in response to satisfying a preset retransmission condition in the lifetime of the automatic repeat request process, retransmit a second packet, where the first packet and the second packet carry the same first predetermined number.

In this embodiment of the present disclosure, in the process of determining whether the preset retransmission condition is satisfied within the lifetime of the automatic repeat request process and the process of retransmitting the second packet, the first sender 1001 continues maintaining the lifetime of the automatic repeat request process.

In this embodiment of the present disclosure, the first predetermined number includes at least one of: a process number or a packet number.

In this embodiment of the present disclosure, the preset retransmission condition includes at least one of the conditions below.

1. An incorrect-reception acknowledgement frame returned by a receiver is received.

2. The time when a channel is obtained through a contention access mechanism is in the lifetime of the automatic repeat request process.

3. All time instants within a first predetermined time interval after the incorrect-reception acknowledgement frame returned by the receiver is received are in the lifetime of the automatic repeat request process.

4. An acknowledgement frame returned by the receiver is not received within a second predetermined time interval. The acknowledgement frame includes a correct-reception acknowledgement frame or an incorrect-reception acknowledgement frame.

In some embodiments of the present disclosure, when the incorrect-reception acknowledgement frame returned by the receiver is received, the first sender 1001 may retransmit the second packet using one of the methods below.

In a first method, the second packet is retransmitted after the first predetermined time interval (for example, Short Interframe Space (SIFS)) after the incorrect-reception acknowledgement frame returned by the receiver is received.

In this method, all time instants within a first predetermined time interval after the incorrect-reception acknowledgement frame returned by the receiver is received are within the lifetime of the automatic repeat request process by default. Therefore, it is considered that the lifetime does not expire after the first predetermined time interval, and the second packet can be retransmitted after the first predetermined time interval.

In a second method, the second packet is retransmitted after the incorrect-reception acknowledgement frame returned by the receiver is received, within the lifetime, and when the channel is obtained through the contention access mechanism.

In a third method, when all time instants within the first predetermined time interval after the incorrect-reception acknowledgement frame returned by the receiver is received are within the lifetime of the automatic repeat request process, the second packet is retransmitted after the first predetermined time interval after the incorrect-reception acknowledgement frame returned by the receiver is received; when some or all of the time instants within the first predetermined time interval after the incorrect-reception acknowledgement frame returned by the receiver is received are beyond the lifetime of the automatic repeat request process, the lifetime of the automatic repeat request process is extended to a third predetermined time interval that is following the first predetermined time interval after the incorrect-reception acknowledgement frame returned by the receiver is received. The third predetermined time interval is at least a time required for retransmitting the second packet. The second packet is retransmitted after the first predetermined time interval after the incorrect-reception acknowledgement frame returned by the receiver is received.

In a fourth method, when all time instants within the first predetermined time interval after the incorrect-reception acknowledgement frame returned by the receiver is received are within the lifetime of the automatic repeat request process, the second packet is retransmitted after the first predetermined time interval after the incorrect-reception acknowledgement frame returned by the receiver is received; when some or all of the time instants within the first predetermined time interval after the incorrect-reception acknowledgement frame returned by the receiver is received are beyond the lifetime of the automatic repeat request process, the automatic repeat request process is removed when the lifetime of the automatic repeat request process expires, that is, the second packet is no longer retransmitted after the first predetermined time interval after the incorrect-reception acknowledgement frame returned by the receiver is received.

In this embodiment of the present disclosure, the first packet or the second packet further carries at least one of: a lifetime, an end time instant of the lifetime, a remaining-time length, or a number of remaining times.

In some embodiments of the present disclosure, the second packet is the same as the first packet, or the redundancy version of the second packet is different from the redundancy version of the first packet.

In another embodiment of the present disclosure, the first sender 1001 is further configured to remove or end the automatic repeat request process when the lifetime of the automatic repeat request process expires or a correct-reception acknowledgement frame returned by a receiver is received.

In another embodiment of the present disclosure, when the lifetime is a time length and the lifetime is maintained by timing, expiration of the lifetime means that the timer reaches the time length indicted by the lifetime.

When the lifetime is an end time and the lifetime is maintained by a timing manner, expiration of the lifetime means that the timer reaches the end time.

When the lifetime is the number of times and the lifetime is maintained by a counting manner, expiration of the lifetime means that the counter reaches the number of times indicted by the lifetime.

When the lifetime is the time length and the number of times and the lifetime is maintained by a timing and counting manner, expiration of the lifetime means that one of the following conditions is satisfied: The timer reaches the time length indicted by the lifetime, or the counter reaches the number of times indicted by the lifetime.

When the lifetime is the end time and the number of times and the lifetime is maintained by a timing and counting manner, expiration of the lifetime means that one of the following conditions is satisfied: The timer reaches the end time of the lifetime, or the counter reaches the number of times indicted by the lifetime.

When the lifetime is maintained by a countdown timing manner, expiration of the lifetime means that the timer reaches 0.

When the lifetime is maintained by backward counting, expiration of the lifetime means that the counter reaches 0.

When the lifetime is maintained by a countdown timing and backward counting manner, expiration of the lifetime means that one of the following conditions is satisfied: The timer reaches 0, or the counter reaches 0.

In this embodiment of the present disclosure, the first sender 1001 is configured to remove or end the automatic repeat request process in at least one of the manners below.

1. The first packet is stopped from being sent or the second packet is stopped from being retransmitted.

2. A packet carrying the first predetermined number is stopped from being sent.

3. The first packet is stopped from being sent through an automatic repeat request mechanism or the second packet is stopped from being retransmitted through the automatic repeat request mechanism.

In this embodiment of the present disclosure, the automatic repeat request process corresponding to the first packet or the second packet is removed or ended when the lifetime of the automatic repeat request process expires or the correct-reception acknowledgement frame returned by the receiver is received. In this manner, in the case where a limited number of automatic repeat request processes are simultaneously supported, a new automatic repeat request process can be created for a newly transmitted packet in time, and thus the transmission efficiency is improved.

In this embodiment of the present disclosure, the first predetermined number includes at least one of: a process number or a packet number.

In this embodiment of the present disclosure, when determining that reception of the packet is incorrect, the first receiver 1002 may return an incorrect-reception acknowledgement frame or return no information; when determining that reception of the packet is correct, the first receiver 1002 may return a correct-reception acknowledgement frame.

In this embodiment of the present disclosure, the first receiver 1002 is configured to maintain the lifetime of the automatic repeat request process corresponding to the first predetermined number in at least one of the manners below.

In a first manner, in response to the received packet satisfying a first predetermined condition, the lifetime of the automatic repeat request process corresponding to the first predetermined number starts to be maintained. When the lifetime of the automatic repeat request process is maintained through a timer, the timer may be caused to start timing or countdown timing. When the lifetime of the automatic repeat request process is maintained through a counter, the counter may be caused to start counting or backward counting.

In a second manner, in response to the received packet satisfying a second predetermined condition, the lifetime of the automatic repeat request process that is the same as the first predetermined number of the packet continues being maintained. When the lifetime of the automatic repeat request process is maintained through a timer, the timer may be caused to continue timing or countdown timing or may be caused to perform timing or countdown timing according to a regained lifetime. When the lifetime of the automatic repeat request process is maintained through a counter, the counter may be caused to start counting or backward counting or may be caused to perform counting or backward counting according to a regained lifetime.

In some embodiments of the present disclosure, the first predetermined condition includes one of the following: the received packet is a newly transmitted packet; or the first predetermined number of the received packet is different from first predetermined numbers corresponding to all currently maintained automatic repeat request processes.

The second predetermined condition includes one of the following: the received packet is a retransmitted packet; or an automatic repeat request process that is the same as the first predetermined number of the packet exists among currently maintained automatic repeat request processes.

In some embodiments of the present disclosure, the first receiver 1002 may determine whether the received packet is a newly transmitted packet or a retransmitted packet in one of the manners below.

In a first manner, it is determined whether the received packet is a newly transmitted packet or a retransmitted packet according to new-transmission indication information carried in the received packet. In some embodiments, when a newly transmitted packet is indicated in the new-transmission indication information, it is determined that the received packet is a newly transmitted packet; when a retransmitted packet is indicated in the new-transmission indication information, it is determined that the received packet is a retransmitted packet.

In a second manner, it is determined whether the process number carried in the packet is the same as the process number corresponding to a created or configured automatic repeat request process. In some embodiments, when the process number carried in the packet is different from the process number corresponding to the created or configured automatic repeat request process, it is determined that the received packet is a newly transmitted packet; when the process number carried in the packet is the same as the process number corresponding to the created or configured automatic repeat request process, it is determined that the received packet is a retransmitted packet.

In a third manner, it is determined whether the packet number carried in the packet is the same as the packet number corresponding to a created or configured automatic repeat request process. In some embodiments, when the packet number carried in the packet is different from the packet number corresponding to the created or configured automatic repeat request process, it is determined that the received packet is a newly transmitted packet; when the packet number carried in the packet is the same as the packet number corresponding to the created or configured automatic repeat request process, it is determined that the received packet is a retransmitted packet.

In this embodiment of the present disclosure, the first receiver 1002 may obtain the lifetime in one of the manners below.

In a first manner, the lifetime is obtained according to a second predetermined number of the packet and a mapping between the lifetime and the second predetermined number of the packet.

In a second manner, the lifetime is obtained according to the second predetermined number of the packet and a mapping relationship between the second predetermined number of the packet and one of an end time instant of the lifetime, a remaining-time length, or a number of remaining times.

In a third manner, the lifetime is obtained according to a lifetime carried in the packet.

In a fourth manner, the lifetime is obtained according to a notified lifetime.

In a fifth manner, the lifetime is obtained according to a negotiated lifetime.

In a sixth manner, the lifetime is obtained according to a preset lifetime.

In some embodiments of the present disclosure, the second predetermined number may be a redundancy version number.

In another embodiment of the present disclosure, the packet is discarded when it is determined that reception of the packet is incorrect, the received packet is a newly transmitted packet, and the first predetermined number carried in the packet cannot be obtained; or when it is determined that reception of the packet is incorrect, the received packet is a retransmitted packet, and the first predetermined number carried in the packet cannot be obtained.

In this embodiment of the present disclosure, the first receiver 1002 is further configured to remove or end the automatic repeat request process when the lifetime of the automatic repeat request process expires.

In this embodiment of the present disclosure, the automatic repeat request process corresponding to the first packet or the second packet is removed or ended when the lifetime of the automatic repeat request process expires. In this manner, in the case where a limited number of automatic repeat request processes are simultaneously supported, a new automatic repeat request process can be created for a newly transmitted packet in time, and thus the transmission efficiency is improved.

Figure 11:
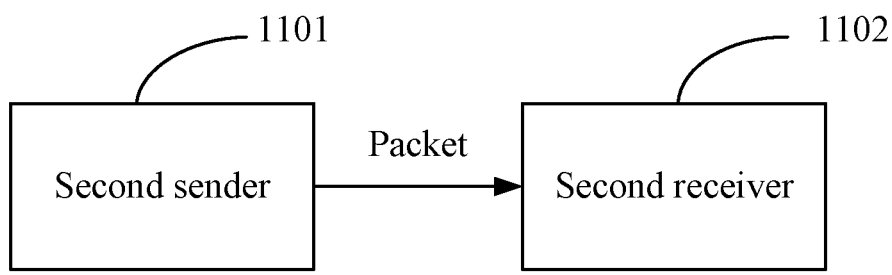
FIG. 11 is a schematic diagram illustrating a structure of a transmission system according to another embodiment of the present disclosure.

Referring to FIG. 11, another embodiment of the present disclosure provides a transmission system. The transmission system includes a second sender 1101 and a second receiver 1102.

The second sender 1101 is configured to create an automatic repeat request process for a first packet, set a lifetime for the automatic repeat request process and send the first packet.

The second receiver 1102 is configured to receive a packet, and in response to determining that reception of the packet is incorrect, maintain the lifetime of a first automatic repeat buffer block corresponding to the packet.

In this embodiment of the present disclosure, the implementation process of the second sender 1101 is the same as that of the first sender 1001. The details are not repeated here.

In another embodiment of the present disclosure, the second receiver 1102 is further configured to buffer the received packet in the first automatic retransmission buffer block or configured to combine the received packet with a packet buffered in the first automatic retransmission buffer block and then buffer the combined packet in the first automatic retransmission buffer block.

In this embodiment of the present disclosure, when determining that reception of the packet is incorrect, the second receiver 1102 may return an incorrect-reception acknowledgement frame or return no information; when determining that reception of the packet is correct, the second receiver 1102 may return a correct-reception acknowledgement frame.

In this embodiment of the present disclosure, the second receiver 1102 is used for maintaining the lifetime of the first automatic retransmission buffer block corresponding to the packet in at least one of the manners below.

In a first manner, in response to the packet satisfying a third predetermined condition, the lifetime of the first automatic retransmission buffer block corresponding to the packet starts to be maintained.

In a second manner, in response to the packet satisfying a fourth predetermined condition, the lifetime of the first automatic retransmission buffer block corresponding to the packet continues being maintained.

In a third manner, in response to the packet satisfying the third predetermined condition, the method further includes configuring the lifetime of the first automatic retransmission buffer block for the packet.

In this embodiment of the present disclosure, the third predetermined number includes one of the following conditions: a newly transmitted packet is indicated in new-transmission indication information carried in the packet; or a third predetermined number carried in the packet is different from third predetermined numbers carried in packets buffered in all automatic retransmission buffer blocks in an automatic retransmission buffer.

In this embodiment of the present disclosure, the case where the third predetermined number carried in the packet is different from third predetermined numbers carried in packets buffered in all automatic retransmission buffer blocks in the automatic retransmission buffer may include the two cases below.

1. The received packet is a newly transmitted packet.
2. The received packet is a retransmitted packet, but the lifetime of the automatic retransmission buffer block maintained before the packet has ended, that is, the automatic retransmission buffer block has been cleared or overridden.

In this embodiment of the present disclosure, the fourth predetermined number includes one of the following conditions: A retransmitted packet is indicated in new-transmission indication information carried in the packet; or a second automatic retransmission buffer block exists in the automatic retransmission buffer.

In some embodiments of the present disclosure, a third predetermined number carried in a packet buffered in the second automatic retransmission buffer block is the same as a third predetermined number carried in the received packet.

In some embodiments of the present disclosure, the third predetermined number includes one of a packet number or a identifier for a station sending the packet.

In some embodiments of the present disclosure, the identifier for a station includes one of: an association identifier, a partial association identifier, or a MAC address.

In some embodiments of the present disclosure, the partial association identifier may be a part of the association identifier or may be calculated from the association identifier.

In some embodiments of the present disclosure, the lifetime of an automatic retransmission buffer block may be maintained by timing or countdown timing.

In this embodiment of the present disclosure, the second receiver 1102 may determine whether the received packet is a newly transmitted packet or a retransmitted packet in one of the manners below.

In a first manner, it is determined whether the received packet is a newly transmitted packet or a retransmitted packet according to new-transmission indication information carried in the received packet. In one embodiment, when a newly transmitted packet is indicated in the new-transmission indication information, it is determined that the received packet is a newly transmitted packet; when a retransmitted packet is indicated in the new-transmission indication information, it is determined that the received packet is a retransmitted packet.

In a second manner, it is determined whether the third predetermined number carried in the received packet is the same as third predetermined numbers carried in packets buffered in automatic retransmission buffer blocks. In some embodiments, when the third predetermined number carried in the packet is different from third predetermined numbers carried in packets buffered in all automatic retransmission buffer blocks, it is determined that the received packet is a newly transmitted packet; when a second automatic repeat buffer block exists in the automatic repeat buffer, it is determined that the received packet is a retransmitted packet.

In another embodiment of the present disclosure, the second receiver 1102 is further configured to clear or override the first automatic repeat buffer block corresponding to the packet when the lifetime of the first automatic repeat buffer block corresponding to the packet expires.

In this embodiment of the present disclosure, an automatic retransmission buffer block is cleared or overridden when the lifetime of the automatic retransmission buffer block expires so that the automatic retransmission buffer block is released in time. In this manner, in the case where there are a limited number of automatic retransmission buffer blocks, a new packet can be buffered in time, and thus the transmission efficiency is improved.

It is to be understood by those having ordinary skill in the art that some or all steps of the preceding method and function modules/units in the preceding system or device may be implemented as software, firmware, hardware and suitable combinations thereof. In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The storage media include, but are not limited to, a RAM, a ROM, an EEPROM, a flash memory or other memory technologies, a CD-ROM, a DVD or other optical storages, a magnetic cassette, a magnetic tape, a magnetic disk or other magnetic storage devices, or any other medium that can be used for storing desired information and that can be accessed by a computer. Moreover, as is known to those having ordinary skill in the art, communication media generally include computer-readable instructions, data structures, program modules, or other data in carriers or in modulated data signals transported in other transport mechanisms and may include any information delivery medium.

The implementations disclosed in embodiments of the present disclosure are intended to facilitate an understanding of embodiments of the present disclosure and not to limit embodiments of the present disclosure. Any person skilled in the art to which embodiments of the present disclosure pertain may make any modifications and changes in the form and details of implementation without departing from the spirit and scope disclosed in embodiments of the present disclosure, but the scope of the present patent is still subject to the scope defined by the appended claims.

What is claimed is:

1. A transmission method, comprising:
creating an automatic repeat request process for a first packet; setting a lifetime for the automatic repeat request process; and sending the first packet; and
in response to determining that a preset retransmission condition in the lifetime of the automatic repeat request process is satisfied, retransmitting a second packet, wherein the first packet and the second packet carry a same first predetermined number;
wherein the preset retransmission condition comprises that at least part of the time instants within the first predetermined time interval after an incorrect-reception acknowledgement frame returned by the receiver is received is beyond the lifetime of the automatic repeat request;
wherein retransmitting the second packet comprises:
extending the lifetime of the automatic repeat request process to a third predetermined time interval following the first predetermined time interval after the incorrect-reception acknowledgement frame returned by the receiver is received, wherein the third predetermined time interval is at least a time period required for retransmitting the second packet; and
retransmitting the second packet after the first predetermined time interval after the incorrect-reception acknowledgement frame returned by the receiver is received.

2. The transmission method of claim 1, wherein the lifetime comprises at least one of: a time length, an end time instant of the lifetime, or a number of times, wherein
the time length comprises one of: an effective-time length or a remaining-time length; and
the number of times comprises one of: a total number of times of a newly transmitted packet and a retransmitted packet carrying a same first predetermined number as the newly transmitted packet, a total number of remaining times of the newly transmitted packet and the retransmitted packet carrying the same first predetermined number as the newly transmitted packet, a total number of times of the retransmitted packet, or a number of remaining times of the retransmitted packet;
wherein the first predetermined number comprises at least one of: a process number or a packet number.

3. The transmission method of claim 1, further comprising:
keeping the lifetime of the automatic repeat request process until the lifetime of the automatic repeat request process expires.

4. The transmission method of claim 1, wherein the preset retransmission condition further comprises at least one of the following:
an incorrect-reception acknowledgement frame returned by a receiver is received;
a time instant when a channel is obtained through a contention access mechanism is within the lifetime of the automatic repeat request process;
all time instants within a first predetermined time interval after the incorrect-reception acknowledgement frame returned by the receiver is received are within the lifetime of the automatic repeat request process; or
an acknowledgement frame returned by the receiver is not received within a second predetermined time interval.

5. The transmission method of claim 1, wherein in response to the preset retransmission condition being one of the following: an incorrect-reception acknowledgement frame returned by a receiver is received, or all time instants within a first predetermined time interval after the incorrect-reception acknowledgement frame returned by the receiver is received are within the lifetime of the automatic repeat request process, retransmitting the second packet comprises:
    retransmitting the second packet after the first predetermined time interval after the incorrect-reception acknowledgement frame returned by the receiver is received.

6. The transmission method of claim 1, wherein the lifetime is obtained in one of the following manners:
    obtained according to a second predetermined number of the packet and a mapping relationship between the lifetime and the second predetermined number of the packet, wherein the second predetermined number is a redundancy version number;
    obtained according to the second predetermined number of the first packet and a mapping relationship between the second predetermined number of the first packet and one of an end time instant of the lifetime, a remaining-time length, or a number of remaining times;
    obtained according to a notified lifetime;
    obtained according to a negotiated lifetime; or
    obtained according to a preset lifetime.

7. The transmission method of claim 1, wherein the first packet or the second packet further carries at least one of:
    the lifetime, an end time instant of the lifetime, a remaining-time length, or a number of remaining times.

8. The transmission method of claim 1, wherein the second packet is the same as the first packet, or a redundancy version of the second packet is different from a redundancy version of the first packet.

9. The transmission method of claim 1, further comprising:
    removing or ending the automatic repeat request process when the lifetime of the automatic repeat request process expires or a correct-reception acknowledgement frame returned by a receiver is received.

10. The transmission method of claim 9, wherein removing or ending the automatic repeat request process comprises at least one of:
    stopping sending the first packet or stopping retransmitting the second packet;
    stopping sending a packet carrying the first predetermined number; or
    stopping sending the first packet or stopping retransmitting the second packet through an automatic repeat request mechanism.

11. A transmission apparatus, comprising a processor and a computer-readable storage medium storing instructions, wherein the processor executes the instructions to perform the transmission method of claim 1.

12. A non-transitory computer-readable storage medium, the storage medium storing a computer program, wherein when a processor is configured to, when executed the computer program, to perform the transmission method of claim 1.

13. A transmission method, comprising:
    receiving a first packet from a sender;
    in response to determining that reception of the first packet is incorrect and obtaining a first predetermined number carried in the first packet, sending an incorrect-reception acknowledgement frame to the sender, and keeping a lifetime of an automatic repeat request process corresponding to the first predetermined number until the lifetime of the automatic repeat request process expires, wherein the first predetermined number comprises at least one of: a process number or a packet number; and
    receiving a second packet retransmitted by the sender after a first predetermined time interval in a case where the sender determines that the lifetime of the automatic repeat request process satisfies a preset retransmission condition and extends the lifetime of the automatic repeat request process to a third predetermined time interval following the first predetermined time interval after the sender receives the incorrect-reception acknowledgement frame,
    wherein the preset retransmission condition comprises that at least part of the time instants within the first predetermined time interval after the sender receives an incorrect-reception acknowledgement frame returned by the receiver is beyond the lifetime of the automatic repeat request; and
    wherein the first packet and the second packet carry a same first predetermined number.

14. The transmission method of claim 13, further comprising:
    removing or ending the automatic repeat request process when the lifetime of the automatic repeat request process expires.

15. The transmission method of claim 13, wherein maintaining the lifetime of the automatic repeat request process corresponding to the first predetermined number comprises at least one of:
    in response to the first packet received satisfying a first predetermined condition, starting to maintain the lifetime of the automatic repeat request process corresponding to the first predetermined number; or
    in response to the first packet received satisfying a second predetermined condition, continuing maintaining the lifetime of the automatic repeat request process that is the same as the first predetermined number of the first packet.

16. The transmission method of claim 15, wherein the first predetermined condition comprises one of the following:
    the first packet received is a newly transmitted packet; or
    the first predetermined number of the received first packet is different from each of first predetermined numbers corresponding to all currently maintained automatic repeat request processes.

17. A transmission method, comprising:
    receiving a first packet from a sender;
    in response to determining that reception of the first packet is incorrect, sending an incorrect-reception acknowledgement frame to the sender, and keeping a lifetime of a first automatic retransmission buffer block corresponding to the first packet until the lifetime of the automatic repeat request process expires; and
    receiving a second packet retransmitted by the sender after a first predetermined time interval in a case where the sender determines that the lifetime of the automatic repeat request process satisfies a preset retransmission condition and extends the lifetime of the automatic repeat request process to a third predetermined time interval following the first predetermined time interval after the sender receives the incorrect-reception acknowledgement frame;
    wherein the preset retransmission condition comprises that at least part of the time instants within the first predetermined time interval after the sender receives an incorrect-reception acknowledgement frame returned by the receiver is beyond the lifetime of the automatic repeat request; and wherein the first packet and the second packet carry a same first predetermined number which comprises at least one of: a process number or a packet number.

18. The transmission method of claim 17, further comprising:

clearing or overriding the first automatic retransmission buffer block corresponding to the first packet when the lifetime of the first automatic retransmission buffer block corresponding to the first packet expires.

19. The transmission method of claim 17, wherein keeping the lifetime of the first automatic retransmission buffer block corresponding to the first packet comprises at least one of:

in response to the first packet satisfying a third predetermined condition, keeping the lifetime of the first automatic retransmission buffer block corresponding to the first packet; or in response to the first packet satisfying a fourth predetermined condition, continuing keeping the lifetime of the first automatic retransmission buffer block corresponding to the first packet; and wherein in response to the first packet satisfying the third predetermined condition, the method further comprises configuring the lifetime of the first automatic retransmission buffer block for the first packet.

20. The transmission method of claim 19, wherein the third predetermined condition comprises one of the following:

a newly transmitted packet is indicated in new-transmission indication information carried in the first packet; or a third predetermined number carried in the first packet is different from third predetermined numbers carried in packets buffered in all automatic retransmission buffer blocks in an automatic retransmission buffer.

* * * * *